(12) United States Patent
Neale et al.

(10) Patent No.: US 11,459,242 B2
(45) Date of Patent: Oct. 4, 2022

(54) STABILIZED ELECTRODES FOR ION BATTERIES AND METHODS OF MAKING THE SAME

(71) Applicant: Alliance for Sustainable Energy, LLC, Golden, CO (US)

(72) Inventors: Nathan Richard Neale, Denver, CO (US); Gerard Zachary Carroll, Golden, CO (US); Gregory Frank Pach, Denver, CO (US); Maxwell Connor Schulze, Golden, CO (US); Trevor Russell Martin, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 329 days.

(21) Appl. No.: 16/743,389

(22) Filed: Jan. 15, 2020

(65) Prior Publication Data
US 2020/0223704 A1 Jul. 16, 2020

Related U.S. Application Data

(60) Provisional application No. 62/935,436, filed on Nov. 14, 2019, provisional application No. 62/872,399, (Continued)

(51) Int. Cl.
*H01M 4/38* (2006.01)
*C01B 33/12* (2006.01)
(Continued)

(52) U.S. Cl.
CPC ............ *C01B 33/12* (2013.01); *H01M 4/386* (2013.01); *H01M 10/0525* (2013.01); (Continued)

(58) Field of Classification Search
CPC ......... B82Y 30/00; B82Y 40/00; C01B 33/12; C01P 2004/64; H01M 10/0525; (Continued)

(56) References Cited

U.S. PATENT DOCUMENTS

| 8,354,189 B2 | 1/2013 | Pham et al. |
| 2016/0020449 A1 | 1/2016 | Hamers et al. |

(Continued)

FOREIGN PATENT DOCUMENTS

WO 2018213160 A1 11/2018

OTHER PUBLICATIONS

Dalavi, S. et al., "Performance Enhancing Electrolyte Additives for Lithium Ion Batteries with Silicon Anodes," Journal of the Electrochemical Society, vol. 159, No. 10, 2012, 5 pages.
(Continued)

*Primary Examiner* — Victoria H Lynch
(74) *Attorney, Agent, or Firm* — Michael A. McIntyre

(57) ABSTRACT

The present disclosure relates to a silicon nanoparticle that includes a core of silicon having an outer surface that includes $*SiH_{3-x}R_x$, where $*Si$ is a silicon atom on the outer surface of the core, the first layer covers at least a portion of the outer surface, R is a ligand that includes at least one of —O—R', —C—R', —N—R', —Si—R', and/or —S—R', and R' is a functional group that includes at least one of carbon, oxygen, nitrogen, hydrogen, sulfur, and/or phosphorus.

18 Claims, 31 Drawing Sheets

Related U.S. Application Data filed on Jul. 10, 2019, provisional application No. 62/792,516, filed on Jan. 15, 2019.

(51) Int. Cl.
*H01M 10/0525* (2010.01)
*H01M 10/0562* (2010.01)
*B82Y 30/00* (2011.01)
*B82Y 40/00* (2011.01)

(52) U.S. Cl.
CPC ......... *H01M 10/0562* (2013.01); *B82Y 30/00* (2013.01); *B82Y 40/00* (2013.01); *C01P 2004/64* (2013.01); *H01M 2300/0094* (2013.01)

(58) Field of Classification Search
CPC ....... H01M 10/0562; H01M 2300/004; H01M 2300/0094; H01M 4/134; H01M 4/386; Y02E 60/10
See application file for complete search history.

(56) References Cited

U.S. PATENT DOCUMENTS

2018/0277898 A1  9/2018  Juergen et al.
2020/0115397 A1* 4/2020  Adireddy .............. C07F 7/0827

OTHER PUBLICATIONS

Feng, K. et al., "Silicon-Based Anodes for Lithium-Ion Batteries: From Fundamentals to Practical Applications," Wiley Small, vol. 14, 2018, 33 pages.
Korshagen, U. et al., "Nonthermal Plasma Synthesis of Nanocrystals: Fundamental Principles, Materials, and Applications," Chemical Reviews, vol. 116, 2016, pp. 11016 to 11127.
Mangolini, L. et al., "High-Yield Plasma Synthesis of Luminescent Silicon Nanocrystals," Nano Letters, vol. 5, No. 4, 2005, pp. 655-659.
Obrovac, M.N. et al., "Alloy Negative Electrodes for Li-Ion Batteries," Chemical Reviews, vol. 114, 2014, pp. 11444-11502.
Reiss, P. et al., "Synthesis of Semiconductor Nanocrystals, Focusing on Nontoxic and Earth-Abundant Materials," Chemical Reviews, vol. 116, 2016, pp. 10731-10819.
Wheeler, L. et al., "Silyl Radical Abstraction in the Functionalization of Plasma-Synthesized Silicon Nanocrystals," Chemistry of Materials, vol. 27, 2015, pp. 6869-6878.
Wu et al., "Stable Li-ion battery anodes by in-situ polymerization of conducting hydrogel to conformally coat silicon nanoparticles," Nature Communications, 2013, DOI: 10.1038/ncomms2941, 6 pages.
Bareno, J. et al., "Capacity Fade and Its Mitigation in Li-Ion Cells with Silicon-Graphite Electrodes," Journal of Physical Chemistry C, vol. 121, 2017, pp. 20640-20649.
Choi, H. et al., "Control of Surface Chemistry and Electrochemical Performance of Carbon-coated Silicon Anode Using Silane-based Self-Assembly for Rechargeable Lithium Batteries," Bull. Korean Chem. Soc., vol. 31, No. 9, 2010, 8 pages.
Galvez-Aranda, D. et al., "Simulations of a LiF Solid Electrolyte Interphase Cracking on Silicon Anodes Using Molecular Dynamics," Journal of the Electrochemical Society, vol. 165, No. 3, 2018, 15 pages.
Nie, M. et al., "Silicon Solid Electrolyte Interphase (SEI) of Lithium Ion Battery Characterized by Microscopy and Spectroscopy," Journal of Physical Chemistry C, vol. 117, 2013, pp. 13403-13412.
Paloukis, F. et al., "Electrochemical Impedance Spectroscopy study in micro-grain structured amorphous silicon anodes for lithium-ion batteries," Journal of Power of Sources, vol. 331, 2016, pp. 285-292.
Park, Se-Mi et al., "High-Performance Lithium-Ion Polymer Cells Assembled with Composite Polymer Electrolytes based on Core-Shell Structured SiO2 Particles Containing Poly(lithium acrylate) in the Shell," Journal of the Electrochemical Society, vol. 162, No. 2, 2015, 6 pages.
Porcher, W. et al., "Understanding Polyacrylic Acid and Lithium Polyacrylate Binder Behavior in Silicon Based Electrodes for Li-Ion Batteries," Journal of the Electrochemical Society, vol. 164, No. 14, 2017, 9 pages.
Xu, C. et al., "Improved Performance of the Silicon Anode for Li-Ion Batteries: Understanding the Surface Modification Mechanism of Fluoroethylene Carbonate as an Effective Electrolyte Additive," Chemistry of Materials, vol. 27, 2015, pp. 2591 through 2599.
Zhang, J. et al., "Ethers Illume Sodium-Based Battery Chemistry: Uniqueness, Surprise, and Challenges," Advanced Energy Materials, Research News, vol. 8, 2018, 14 pages.
Zhu, Y. et al., "Design Principles for Self-Forming Interfaces Enabling Stable Lithium Metal Anodes," includes Supplementary Information, Cornell University, Applied Physics, https://arxiv.org/abs/1903.09593v1, 36 pages.

* cited by examiner

STABILIZED ELECTRODES FOR ION BATTERIES AND METHODS OF MAKING THE SAME

CROSS-REFERENCE TO RELATED APPLICATIONS

This application claims priority from U.S. Provisional Application Nos. 62/792,516, 62/935,436, and 62/872,399, filed Jan. 15, 2019, Nov. 14, 2019, and Jul. 10, 2019, respectively, the disclosures of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

The identity and structure of the solid electrolyte interphase (SEI) between silicon anodes and electrolyte in lithium-ion batteries is critical for extending the lifetime of the battery by preventing parasitic fade chemistries while facilitating ion transfer and maintaining electrical conductivity with the greater composite matrix. The SEI is composed of many different functional groups. Many of the components that comprise the SEI layer are not stable against electrochemical cycling or calendar aging. Thus, there remains a need for improved chemistry and methods that can improve the long-time stability of ion batteries, such as lithium-ion batteries.

SUMMARY

An aspect of the present disclosure is a silicon nanoparticle (Si NP) that includes a silicon core having an outer surface that includes *$SiH_{3-x}R_x$, where *Si is a silicon atom on the outer surface of the core, the first layer covers at least a portion of the outer surface, R is a ligand that includes at least one of —O—R', —C—R', —N—R', —Si—R', and/or —S—R', and R' is a functional group that includes at least one of carbon, oxygen, nitrogen, hydrogen, sulfur, and/or phosphorus. In some embodiments of the present disclosure, the core may have an average particle size between 1 nm and 500 nm. In some embodiments of the present disclosure, the average particle size may be between 3 nm and 75 nm. In some embodiments of the present disclosure, R' may be derived from a reactant.

In some embodiments of the present disclosure, the reactant may include at least one of N-methyl-2-pyrrolidone (NMP), 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, 4-biphenyl carboxaldehyde, 4-terphenylol, 4-terphenyl thiol, 4-phenylazophenol, polyacrylic acid (PAA), polyacrylonitirile, polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, and/or 2,5-dimethoxybenzene-1,4-dicarboxaldehyde.

In some embodiments of the present disclosure, R' may include at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, and/or a thiol carbonyl. In some embodiments of the present disclosure, the composition may further include a second layer that includes at least one of a binder, a conductive material, and/or an electrolyte, where the second layer includes an inner surface, and the first layer is positioned between the core and the second layer.

In some embodiments of the present disclosure, the binder may include at least one of polyethylene oxide (PEO), polyvinylidene fluoride, styrene butadiene rubber, polyacrylonitrile, carboxymethyl cellulose, polyacrylic acid (PAA), lithium polyacrylate, Nafion, polyacetylene, polyphenylene acetylene, and/or polyphenylene imide. In some embodiments of the present disclosure, the conductive material may include at least one of carbon black, an amorphous carbon, a glassy carbon, a single walled carbon nanotube, a multi-walled carbon nanotube, a functionalized carbon nanotube, graphene, graphene oxide, a functionalized graphene oxide, and/or a carbon fibers.

In some embodiments of the present disclosure, the electrolyte may include at least one of diethyl carbonate, ethylene carbonate, dimethyl carbonate, ethyl methyl carbonate, propylene carbonate, glyme, diglyme, tetraglyme, and/or a polymer. In some embodiments of the present disclosure, the polymer may include at least one of polyethylene oxide and/or polyacrylonitrile. In some embodiments of the present disclosure, the electrolyte may include at least one of lithium phosphate oxynitride, lithium hexfluorophosphate, lithium fluorosulfonimide, and/or lithium trifluoromethylsulfonimide. In some embodiments of the present disclosure, the composition may further include a gap positioned between the first layer and the second layer. In some embodiments of the present disclosure, at least one of the first layer and/or the second layer may be capable of volume expansion and contraction as a result of mass transfer of an ion into and out of the core. In some embodiments of the present disclosure, the ion may be at least one of a lithium ion or a magnesium ion.

An aspect of the present disclosure is a method that includes reacting, in a mixture, a silicon nanoparticle (Si NP) with a reactant, where the Si NP has a silicon core, the silicon core has a surface that includes a silicon-hydrogen group (*$SiH_x$) where $1 \leq x \leq 3$, *Si is a silicon atom on an outer surface of the Si NP, the reacting results in the converting of a portion of the *$SiH_x$ to produce a functionalized silicon nanoparticle comprising *$SiH_{3-x}R_x$, R is a ligand that includes at least one of —O—R', —C—R', —N—R', —Si—R', and/or —S—R', R' is a functional group derived from the reactant, and the reactant includes at least one of a carbonaceous compound, an organic compound, and/or an inorganic compound.

In some embodiments of the present disclosure, the reactant may include at least one of an alkenyl group, an alkynyl group, a carbonyl group, an aromatic, a halo group, an ester, an ether, an epoxide, a carboxylic acid, a carboxylate, an aldehyde, an alcohol, an alkoxide, a peroxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a thiol carbonyl, and/or a phosphonate. In some embodiments of the present disclosure, R' may include at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, and/or a thiol carbonyl.

In some embodiments of the present disclosure, the reactant may include at least one of N-methyl-2-pyrrolidone (NMP), 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, 4-biphenyl carboxaldehyde, 4-terphenylol, 4-terphenyl thiol, 4-phenylazophenol, polyacrylic acid (PAA), polyacrylonitirile, polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, and/or 2,5-dimethoxybenzene-1,4-dicarboxaldehyde.

BRIEF DESCRIPTION OF THE DRAWINGS

Some embodiments are illustrated in referenced figures of the drawings. It is intended that the embodiments and figures disclosed herein are to be considered illustrative rather than limiting.

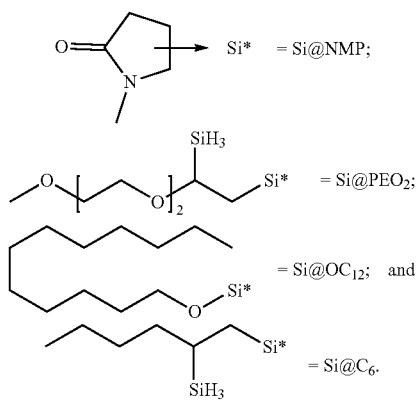

Figure 12A:
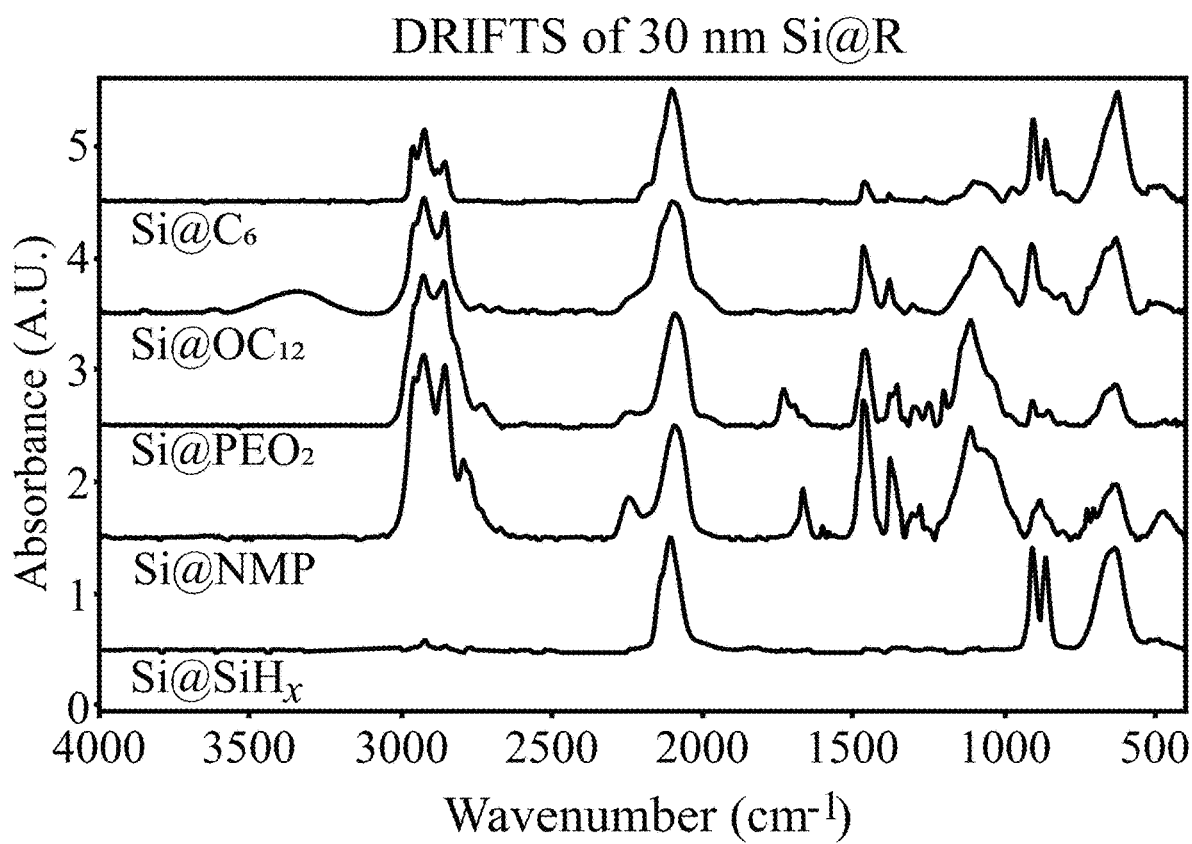
FIG. 12A illustrates diffuse reflectance infrared Fourier transform spectra (DRIFTS) of Si NPs functionalized with non-aromatic reactants, according to some embodiments of the present disclosure.
Figure 12B:
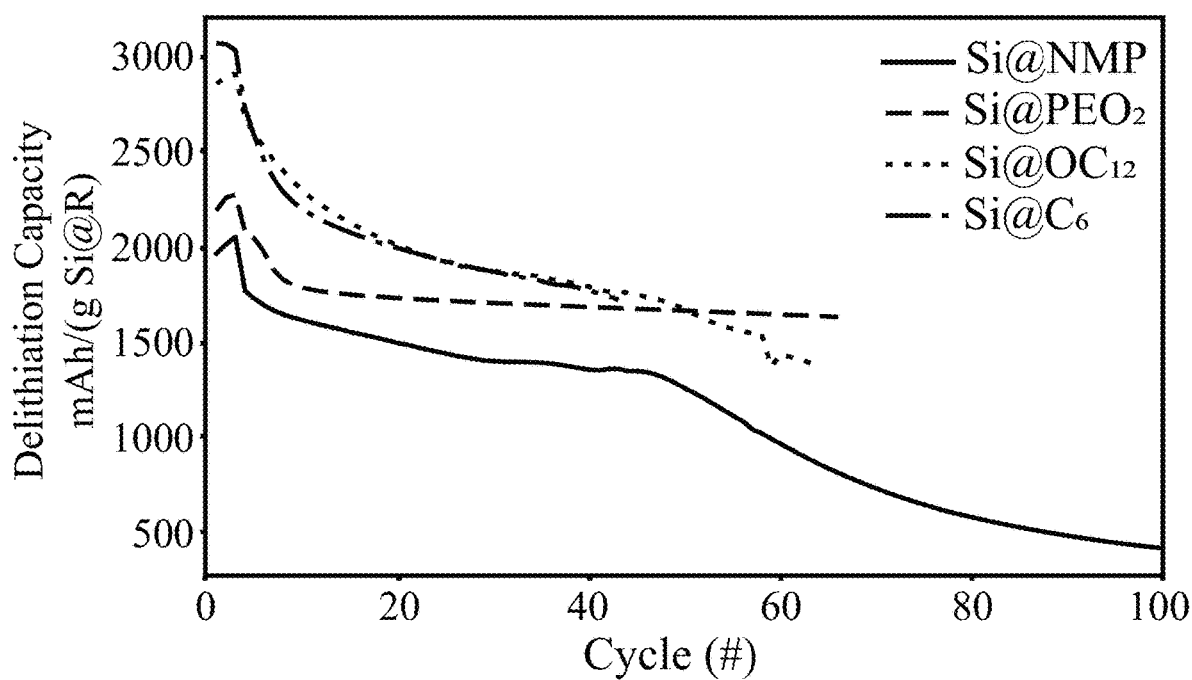
FIG. 12B illustrates cycle lifetimes of the Si NPs functionalized with non-aromatic reactants, once they were formulated into an electrode slurry, cast into a thin film electrode, and sections of the electrode were punched out, assembled into Li-ion half-cell batteries, and cycled to test the ability of the functionalized Si NPs to reversibly store Li-ions, according to some embodiments of the present disclosure.
Figure 12C:
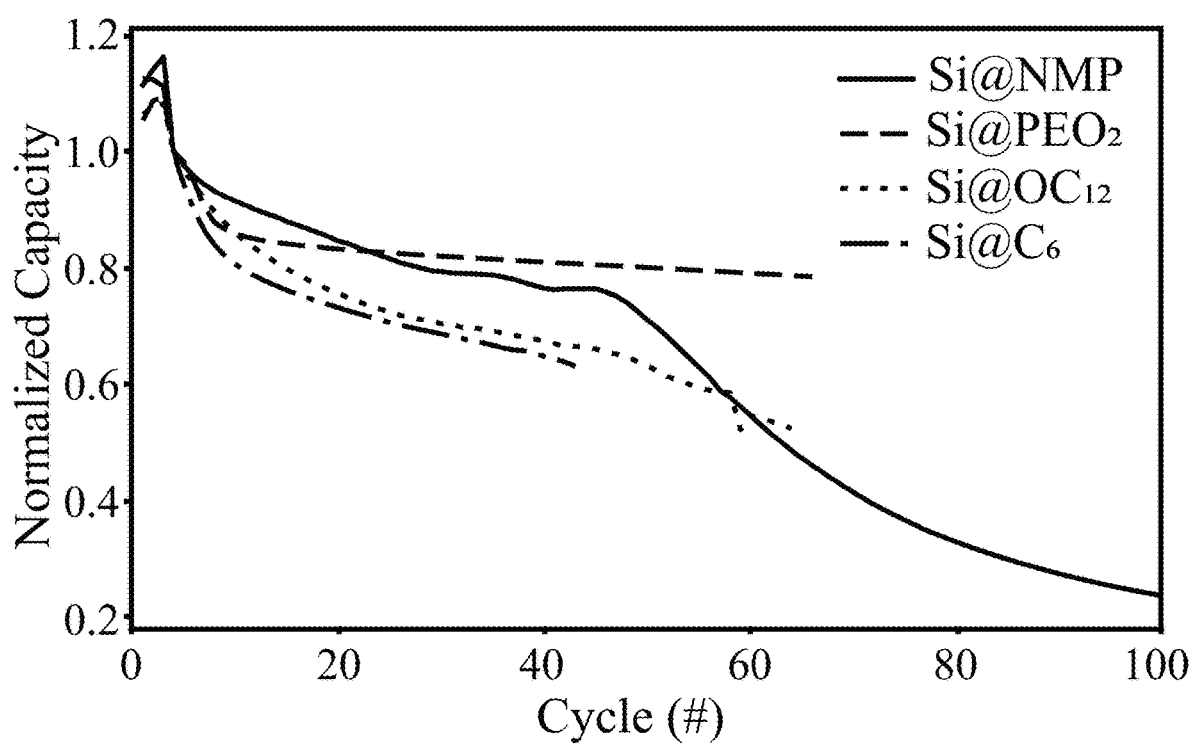
FIG. 12C illustrates a cycle lifetime plot that normalizes the capacity to that of the $4^{th}$ cycle. The first three cycles were specially controlled as the "forming cycles", according to some embodiments of the present disclosure. The legend for FIGS. 12C and 12D is as follows.
Figure 12D:
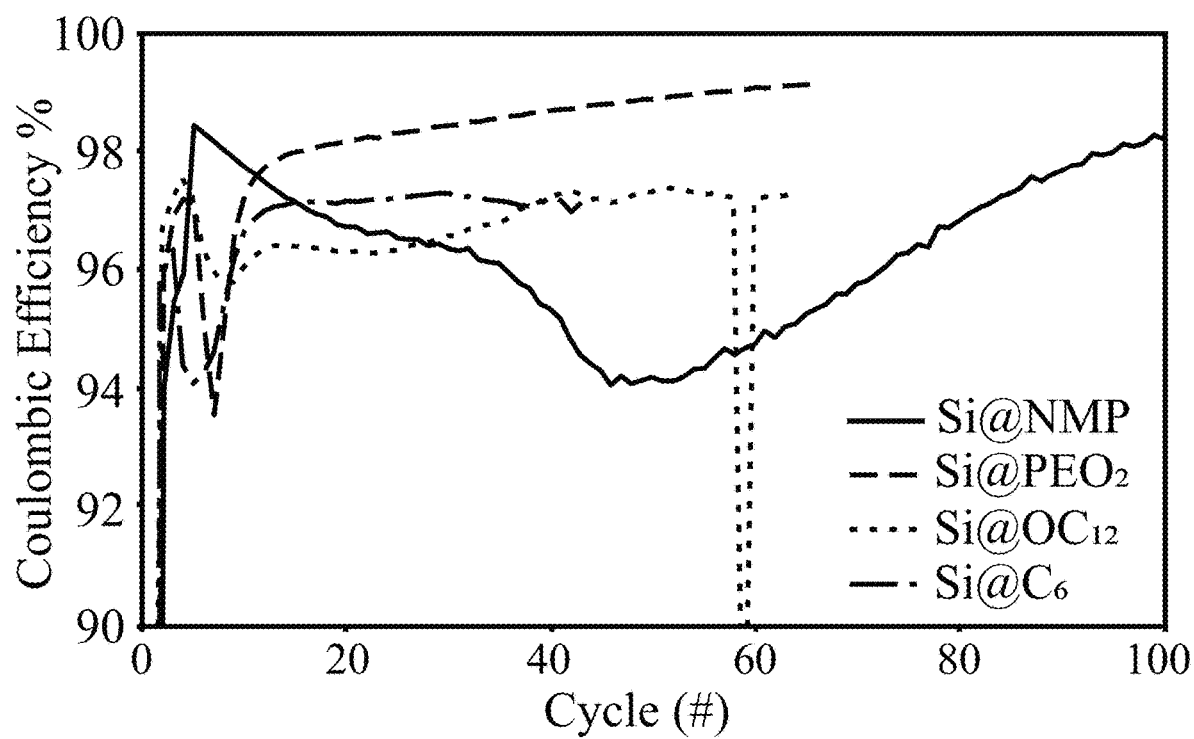

FIG. 12D illustrates the coulombic efficiency of the batteries made using Si NPs functionalized with non-aromatic reactants, for each cycle, according to some embodiments of the present disclosure.

Figure 13A:
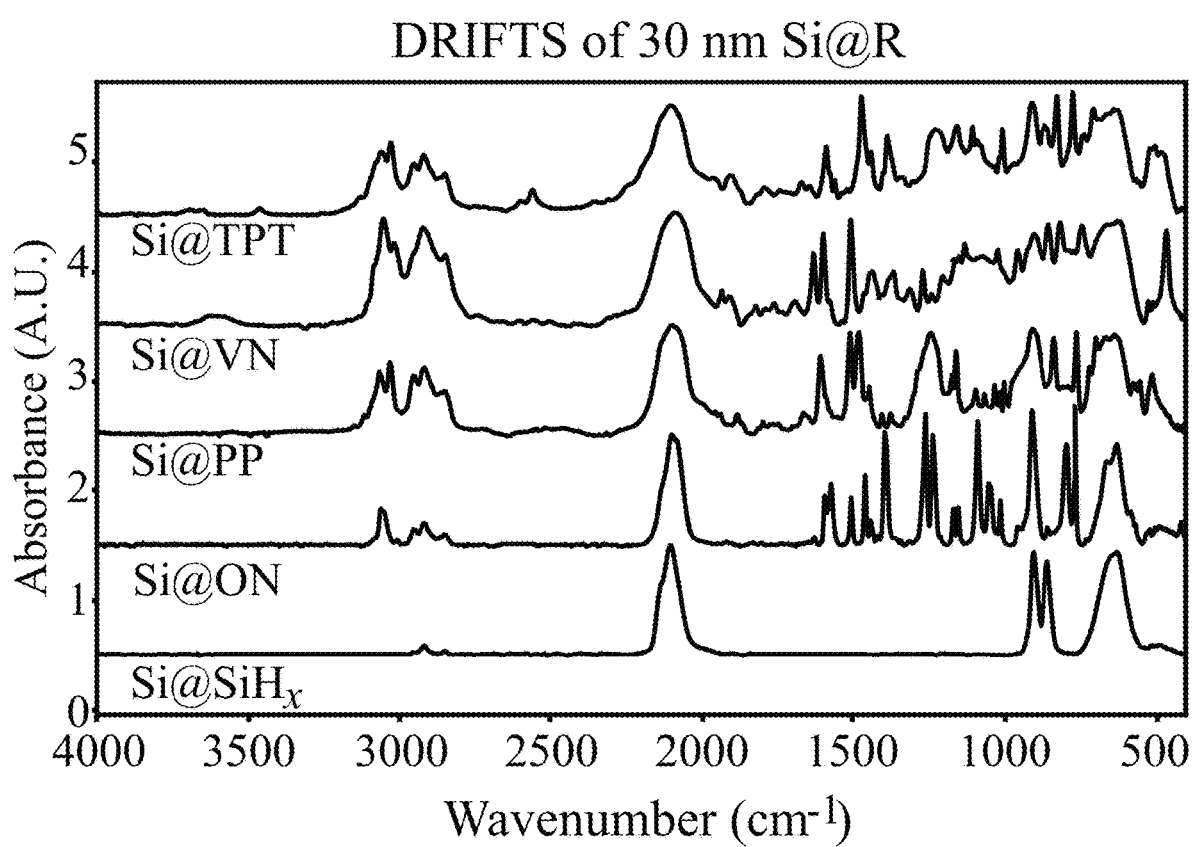

FIG. 13A illustrates diffuse reflectance infrared Fourier transform spectra (DRIFTS) of Si NPs functionalized with aromatic reactants, according to some embodiments of the present disclosure.

Figure 13B:
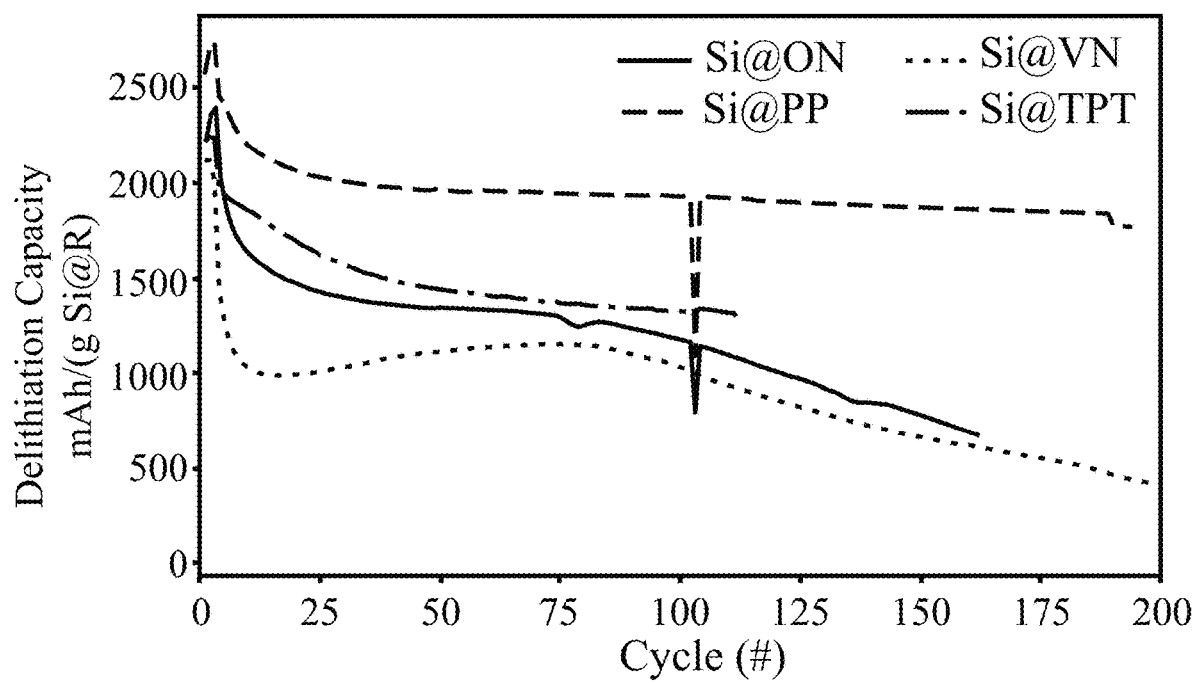

FIG. 13B illustrates cycle lifetimes of the Si NPs functionalized with aromatic reactants, once they were formulated into an electrode slurry, cast into a thin film electrode, and sections of the electrode were punched out, assembled into Li-ion half-cell batteries, and cycled to test the ability of the functionalized Si NPs to reversibly store Li-ions, according to some embodiments of the present disclosure.

Figure 13C:
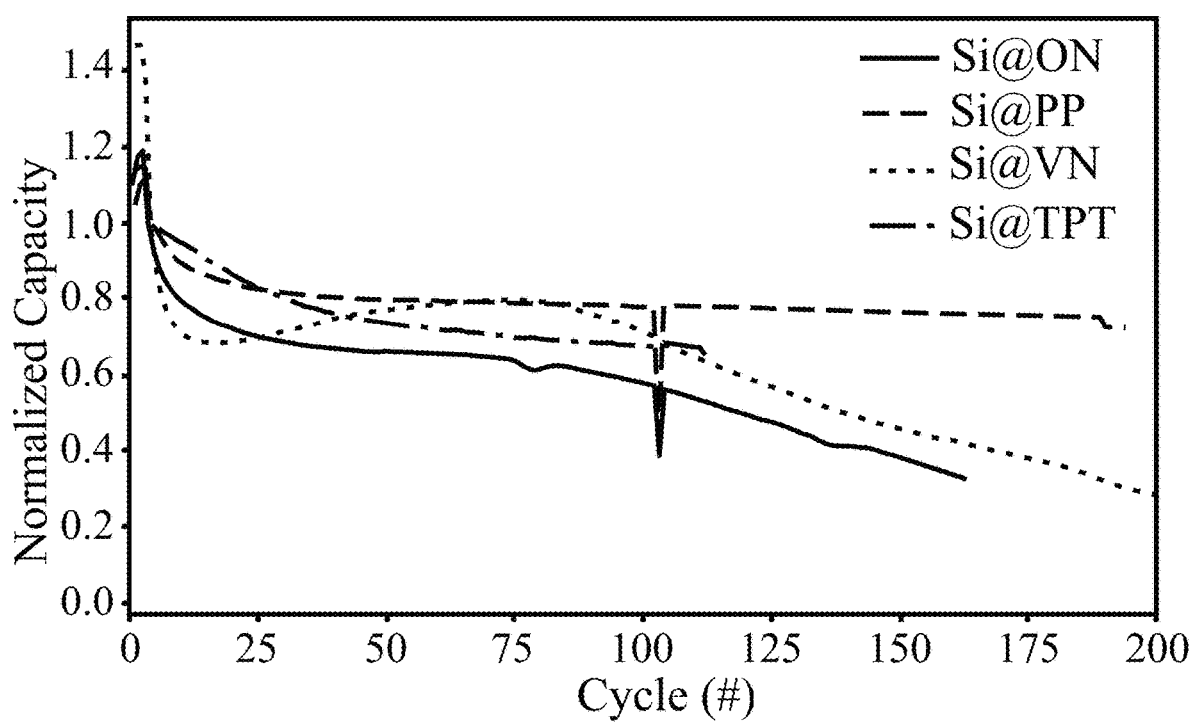

FIG. 13C illustrates a cycle lifetime plot that normalizes the capacity to that of the 4th cycle. The first three cycles were specially controlled as the "forming cycles", according to some embodiments of the present disclosure. The legend for FIGS. 12C and 12 D is as follows:

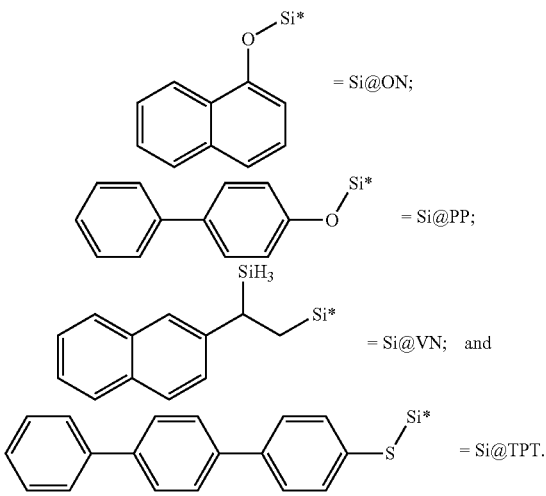

Figure 13D:
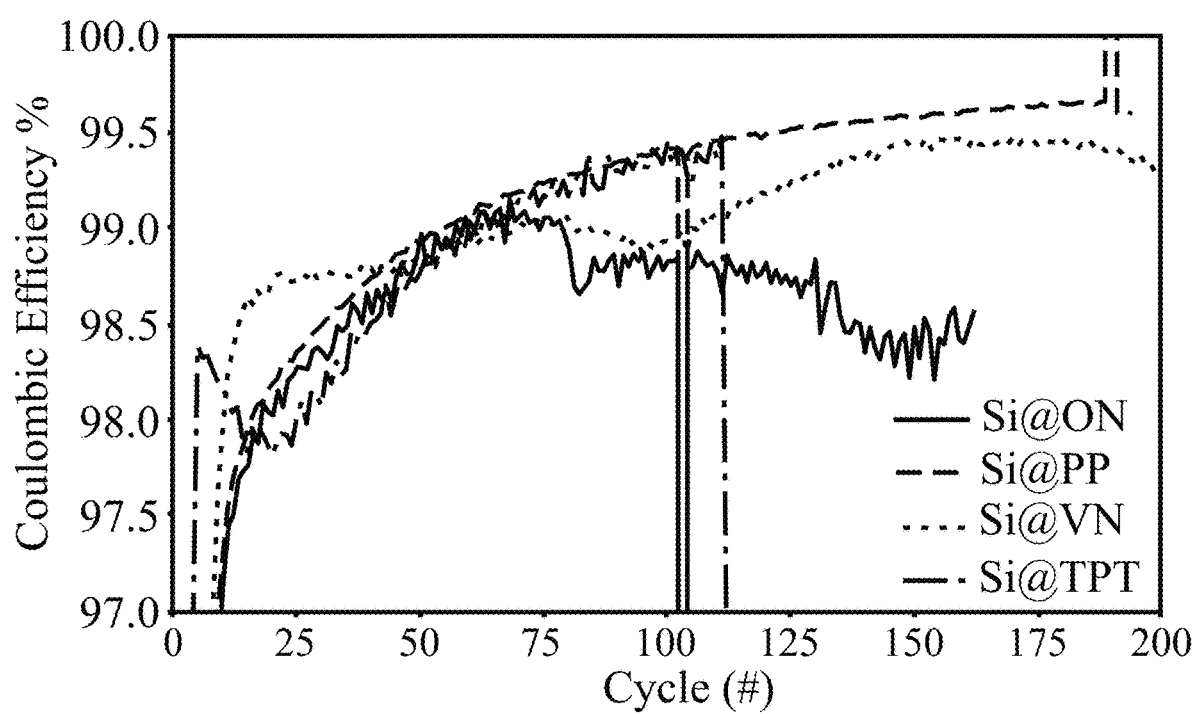

FIG. 13D illustrates the coulombic efficiency of the batteries made using Si NPs functionalized with aromatic reactants, for each cycle, according to some embodiments of the present disclosure.

REFERENCE NUMBERS

| | |
|---|---|
| 100 | particle |
| 110 | core |
| 120 | first layer (i.e. solid electrolyte interphase) |
| 130 | second layer |
| 140 | intermediate layer |
| 145 | reactant |
| 200 | method |
| 205 | starting particle |
| 210 | coating |
| 215 | coated particle |
| 220 | cycling |
| 300 | mixing |
| 301 | active material |
| 302 | reactant |
| 304 | binder |
| 305 | polymer forming agent |
| 306 | conductive material |
| 308 | solvent |
| 309 | slurry |
| 310 | applying |
| 312 | current collector |
| 314 | untreated electrode |

| | |
|---|---|
| 320 | treating |
| 322 | solid electrode |
| 330 | cycled electrode |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The terms "polymer" and "polymeric material", as used herein, refers to a molecule of high relative molecular mass, the structure of which comprises the multiple repetition of units derived, actually or conceptually, from molecules of low relative molecular mass. In certain embodiments, a polymer is comprised of only one monomer species. In certain embodiments, a polymer of the present invention is a copolymer, a terpolymer, a heteropolymer, a block copolymer, or a tapered heteropolymer.

The present disclosure relates to the addition of sacrificial molecules/materials to compositions used to produce battery electrodes, resulting in improved battery performance characteristics (e.g. improved lithium ion and electrical conduction while suppressing undesirable side reactions). Battery lifetime may also be improved by providing better stability against electrochemical cycling and calendar aging. For example, as described herein, molecules including at least one of carbonaceous compounds, organic compounds (e.g. aromatics and/or non-aromatics), and/or inorganic compounds, referred to herein as "reactants", having chemically reactive functional groups (e.g. carbon-carbon double bonds) may be mixed with silicon nanoparticles (Si NPs) having silicon hydride functional groups on the outer surfaces of the Si NPs. As a result, as described herein, at least a portion of the silicon hydride surface groups may react with the added molecules/materials (i.e. reactants) to create Si NPs having a variety of functional groups, which may be subsequently reacted with themselves and/or other materials in subsequent steps, resulting in better performing batteries utilizing these materials.

As described herein, reactions of the starting silicon nanoparticles' hydride groups with reactants may result in a layer of functional groups, ligands, compounds, and/or materials surrounding the silicon cores of the original starting Si NPs. Also, within the scope of the present disclosure is the concept of functional groups, ligands, compounds, and/or materials surrounding the silicon cores of the original starting Si NPs, forming through the cleaving of silicon-silicon bonds near the surface of starting Si NPs. Such layers are referred to herein as the "solid electrolyte interphase" (SEI) (also referred to herein as the "first layer"). As described herein, an initial SEI of mostly reactant-derived functional groups may change during subsequent manufacturing steps and/or during battery operation; e.g. forming of the complete electrode (e.g. anode), manufacture of the complete battery, and/or during actual battery use (e.g. cycling). In some embodiments of the present disclosure, the reacting of silicon hydride functional groups with added reactants, resulting in the forming of an SEI, may be enabled by the use of at least one of a catalyst and/or an initiator. In some embodiments an initiator may be a radical initiator such as at least one of at least one of 1,1'-azobis(cyclohexanecarbonitrile) (ABCN), azobisisobutyronitrile (AIBN), (2,2,6,6-tetramethylpiperidin-1-yl)oxyl (TEMPO), halogens, d-tert-butyl peroxide, and/or benzoyl peroxide.

In some embodiments of the present disclosure, functionalized and/or partially functionalized Si NPs, after an initial reacting of the reactants with silicon hydride groups, may be added to a slurry or mixture that includes at least one of a binder and/or a conductive material to produce an electrode mixture (e.g. an anodic mixture). This mixing of the functionalized Si NPs, in a slurry with the binder and/or conductive material, may result in the forming of a second layer on the outer surface of the SEI (i.e. the first layer), creating a solid-solid interface between the first layer and the second layer. In addition, the combining of the functionalized Si NPs with the binder and/or the conductive material may also result in the reacting of at least a portion of any remaining hydride functional groups with available unreacted and/or freshly added reactants and/or other materials to form functionalized Si NPs. In some embodiments of the present disclosure, at least one of the original hydride groups and/or the functional groups derived from the reactant, may interact with at least one of a binder and/or a conductive material, resulting in at least one of a change to the SEI, a change to the interface between the SEI and the second layer, and/or the creation of an intermediate layer and/or gap positioned between the first layer (i.e. SEI) and the second layer.

A method for synthesizing a Si NP having an SEI (i.e. first layer) or a Si NP having an SEI covered with an outer layer (i.e. second layer) may proceed as described above, in what is essentially a two-step process. In the first step, at least a portion of the original starting hydride groups on the surface of the silicon cores of the starting Si NPs may react with the reactants to form at least an initial SEI (e.g. an SEI that may change during subsequent processing and/or battery operation). In the second step, the at least partially functionalized, SEI-covered (or partially covered) Si NPs may be mixed with additional components of an anodic mixture/slurry (e.g. binder, conductive material, and/or other additives). This mixing may then result in, among other things, the additional conversion of silicon hydride surface groups to the targeted functional groups, the creation of a second layer (e.g. of binder and/or conductive material), and/or the transformation of the initial SEI to a modified SEI. However, in some embodiments of the present disclosure, these two steps may be combined into a single step. For example, starting hydride functionalized Si NPs may be combined substantially simultaneously in a slurry/mixture containing the reactants and the other anodic components (e.g. binder and/or conductive material), such that the reacting of the hydride functional groups with the reactant(s), and the creation of the SEI (i.e. first layer) and/or the second layer (e.g. binder and/or conductive material) occur, at least partially, during this single step process.

Regardless of whether the various components are combined in a one-step process or a multi-step process, a process may then proceed with the applying of the resultant slurry/mixture to an electrically conductive material (i.e. current collector), such as a metal foil. The resultant film of the anodic slurry/mixture may be subsequently converted to a solid by a thermal treating step (i.e. annealing) and/or by a chemical reaction step (e.g. a polycondensation reaction), resulting in the formation of a complete electrode (although the components, i.e. the SEI, may still change) ready to be incorporated into a full battery. Again, as with the upstream steps, the thermal annealing and/or chemical reaction steps may result in, among other things, at least one of the additional conversion of silicon hydride surface groups to other functional groups, the removal of substantially all of any remaining surface hydride groups, the creation and/or transformation of a second layer (e.g. of binder and/or conductive material), the transformation of an intermediate SEI to a further modified SEI, and/or the creation of at least one intermediate layer positioned between the SEI and the second layer.

Next, a newly produced electrode (e.g. anode) may be combined with a second electrode (e.g. cathode), with both subsequently positioned in an electrolyte mixture, resulting in a complete battery cell. Again, as in the previous steps, the contacting of the anode with the electrolyte may initiate the reaction of at least one of unreacted silicon hydride groups, functional groups derived from the reactant(s), anode additives (e.g. binders and/or conductive materials), and/or the electrolyte with at least one of the same components. As a result, the contacting of the newly synthesized anode with the electrolyte may result in, among other things, the additional conversion of silicon hydride surface groups to other functional groups, the creation and/or transformation of the second layer (e.g. of binder and/or conductive material), and/or the transformation of an intermediate SEI to a further modified SEI. Further, the operation of the battery, e.g. cycling between a charged state and a discharged state, may also result in, among other things, the additional conversion of silicon hydride surface groups to other functional groups, the creation and/or transformation of the second layer (e.g. of binder and/or conductive material), and/or the transformation of an intermediate SEI to a further modified SEI.

In some embodiments of the present disclosure, the manufacture of the anodic slurry/mixture, production of the solid anode (e.g. by thermal annealing), and/or fabrication of the complete battery (e.g. with both a cathode and an anode in contact with an electrolyte) may be performed in the absence of the reactant(s). For example, a reactant may not be introduced into a battery system until the electrolyte is formulated, mixed, and contacted with the anode. Thus, in some embodiments of the present disclosure, an electrolyte (e.g. solid or liquid) may be formulated to include at least one reactant, such the Si NPs contained in the solid anode, are not contacted with the reactant until the solid anode is positioned within the electrolyte. In another example, the solid anode may be part of a complete battery that is cycled at least once, without the presence of a reactant, where the reactant is added at some later time to the electrolyte. All of these methods are provided only as illustrative examples and are not intended to be limiting. Other variations and/or combinations of the same method steps, components, and/or features are intended to fall within the scope of the present disclosure.

As a result of the reactions and/or interactions described above, occurring during at least one of an initial functionalizing of the Si NP surface, preparation of the anodic mixture, fabrication of the solid anode, construction of the complete battery, and/or during electrochemical cycling of the battery, ultimately the formation of a stable SEI (i.e. first layer) may result. The reactants, alone or in combination with the other anode/battery components, as shown herein, may impart four important properties with respect to electrode and battery functionality from the perspective of the final stable SEI: (1) act as an ion-conductive material to shuttle ions through the SEI to and from the silicon core; (2) act as a charged sphere around the electrochemically active species (e.g. a silicon core, a graphite core, etc.), such that recovery of intercalated/alloyed ions may be facilitated through electrostatic interactions; (3) form covalent bonds and/or other chemical interaction to bind with the conductive matrix (i.e. the second layer) such that electrical contact is maintained during electrochemical cycling; and (4) provide a stable, mechanically compliant, flexible (e.g. polymeric), and chemically robust SEI and/or second layer that expand and contract with volume changes in the core, but do not undergo further electrochemical reaction and/or chemical reaction following initial electrochemical cycling.

Figure 1A:
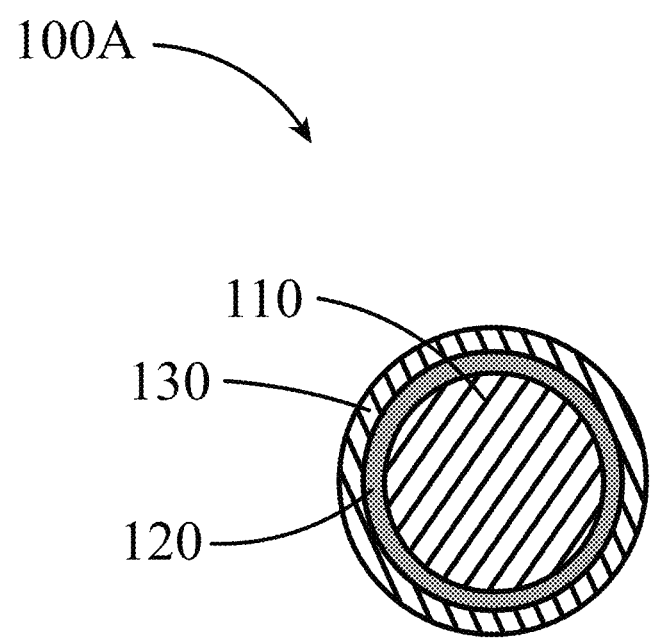
FIGS. 1A, 1B, and 1C illustrate particles for use in electrodes for recyclable batteries, according to some embodiments of the present disclosure.
Figure 1B:
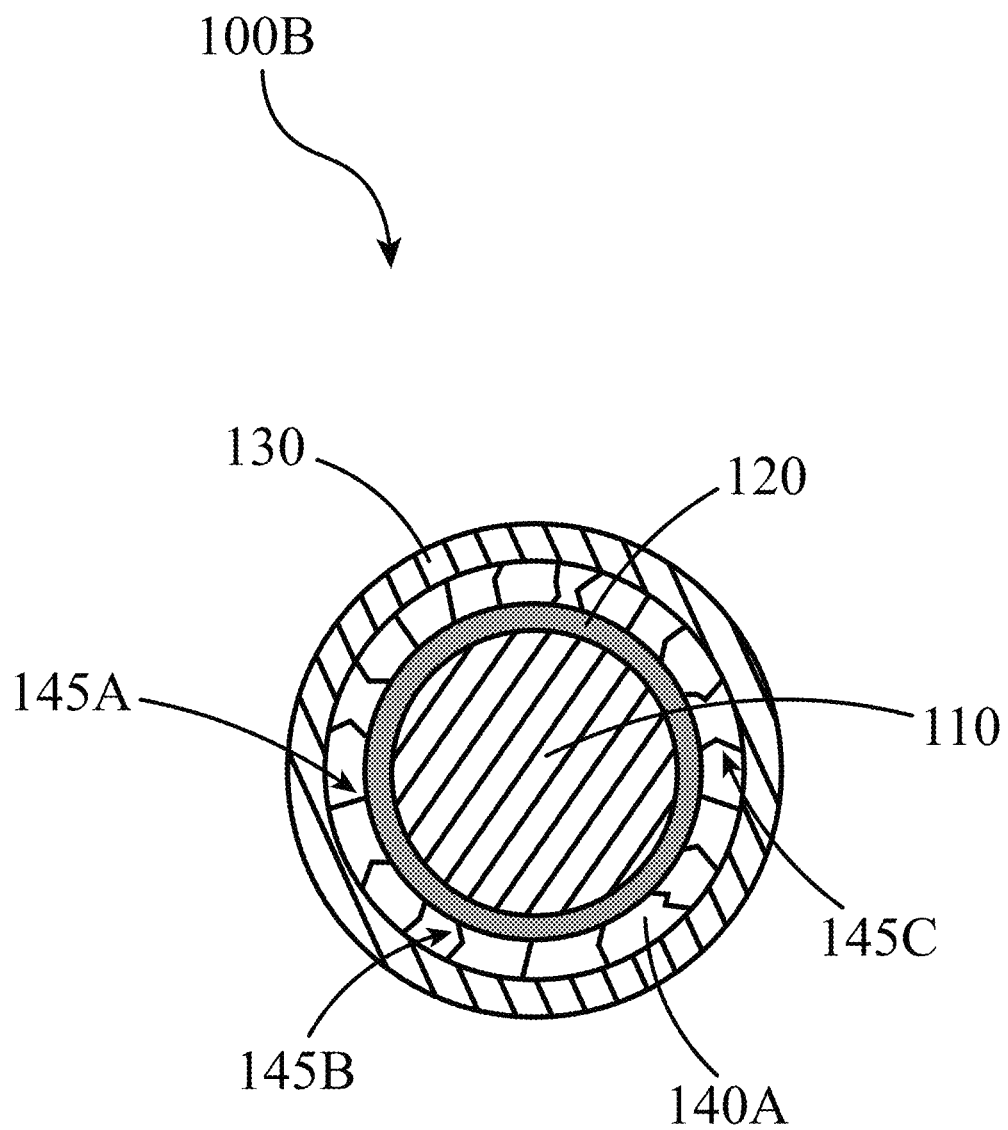
Figure 1C:
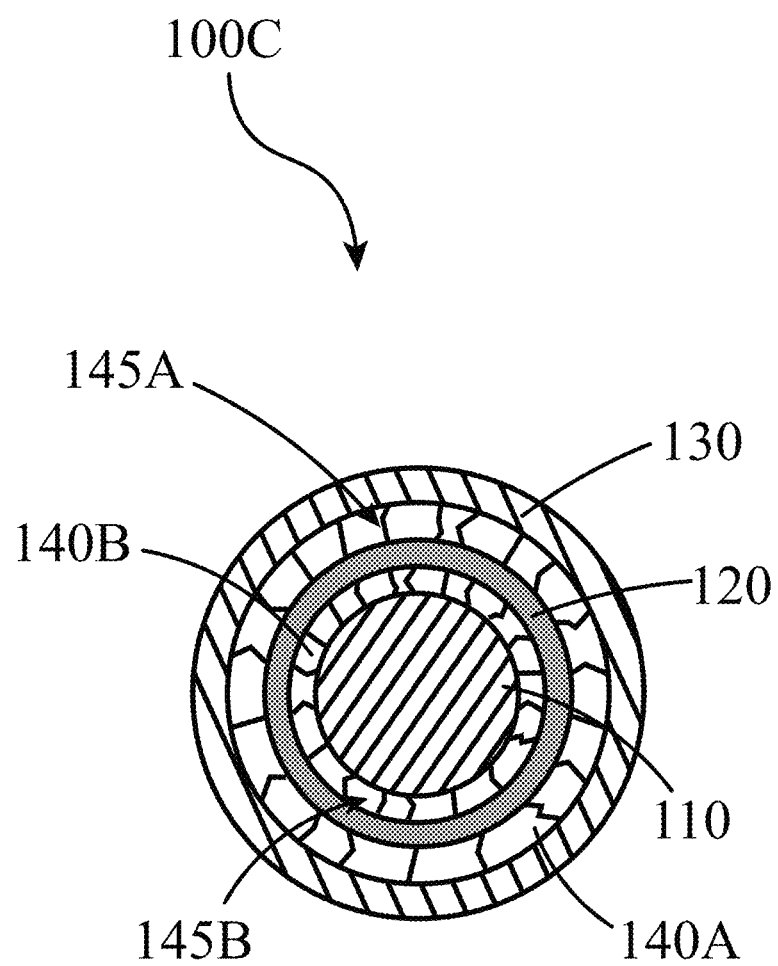

FIGS. 1A, 1B, and 1C illustrate examples of particles, e.g. Si NPs, (100A, 100B, and 100C, respectively), which may be used to produce electrodes (e.g. anode) for rechargeable batteries, for example lithium-ion batteries, according to some embodiments of the present disclosure. These illustrations are cartoons and are not meant to imply a perfect core-shell-shell (FIG. 1A), core-shell-shell-shell (FIG. 1B), core-shell-shell-shell-shell (FIG. 1C) structure. Rather, these schematics provide a way to visualize the various components that are associated with the anodic materials. Referring to FIG. 1A, a first exemplary particle 100A (e.g. Si NP) is illustrated that includes a core 110 covered with a first layer 120 (i.e. an SEI). The particle 100A also includes a second layer 130 covering the first layer 120, such that the first layer 120 is positioned between the core 110 and the second layer 130.

In some embodiments of the present disclosure, a ligand and/or functional group (not shown), resulting from the reaction of starting hydride groups or other core derived 110 chemical group with a reactant, may be positioned at the interface between the core 110 and the first layer 120. Thus, a reactant-derived ligand and/or functional group may at least partially physically bind the first layer 120 (i.e. SEI) to the core 110, for example by covalent bonds and/or ionic interactions and/or other chemical interactions. Further, a reactant-derived ligand and/or functional group may be positioned at the interface between the first layer 120 and the second layer 130. Thus, a reactant-derived ligand and/or functional group may at least partially physically bind the first layer 120 to the second layer 130, for example by covalent bonds, π-conjugated bonds, ionic interactions, and/or other chemical interactions. In addition, in some embodiments of the present disclosure, a reactant-derived ligand and/or functional group may interact and/or react with one or more compounds, chemicals, and/or functional groups (e.g. provided by at least one of a binder, a conductive material, an electrolyte, etc.) present in the first layer 120 and/or second layer 130, such that the reactant-derived ligand and/or functional group may be a part of at least one of the first layer 120 and/or the second layer 130. As described above and in more detail below, a reactant-derived ligand and/or functional group may result from a reaction of a reactant (e.g. a molecule and/or some other material) used in the Si NP's formulation, during at least one of the synthesis of the particle, during formulating of the anodic mixture, during fabrication of the solid electrode and/or complete battery, and/or during electrochemical cycling of the complete battery.

Referring again to FIG. 1A, in some embodiments of the present disclosure, the core 110 of a particle 100A may include an active material for a battery's electrode (e.g. anode and/or cathode). For example, a core 110 may be constructed of carbonaceous materials (graphite, graphene, hard carbon, soft carbon), elemental materials (silicon, tin, aluminum, gallium, germanium, lead), oxide materials, ($M_xO_y$, where M=silicon, tin, and/or other transition metals and O=oxygen) and intermetallic alloy materials ($M_1$-$M_2$ where $M_1$ and $M_2$ are any metal and/or semimetal combination). In some embodiments of the present disclosure, a first layer 120 (i.e. SEI) of a particle 100A may include at least one of a reactant-derived functional group, unreacted reactant, a lithium carbonate, LiF, $Li_2O$, $Li_xSi_yO_z$ [$2 \leq x \leq 8$, $1 \leq y \leq 2$, $2 \leq z \leq 6$], a polyolefin, a semicarbonate carbonate, and/or $PF_x$ [$3 \leq x \leq 6$]. In some embodiments of the present disclosure, a second layer 130 may include at least one of a reactant, an unreacted reactant, a reactant-derived functional group, a binder, a conductive material, an electrolyte, and/or a component contained in the electrolyte.

Examples of a reactant for reacting with, among other things, the hydride groups on the surface of a starting Si NP, a conductive material, a binder, and/or an electrolyte include at least one of N-methyl-2-pyrrolidone (NMP), 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, phenylene diamine, melamine, 1,3,5-triamino benzene, 4,4'-biphenyl diamine, 1,2,4,5-benzentetraamine, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, biphenyl 4-carboxaldehyde, phenol 4-carboxaldehyde, hexaketocyclohexane, cyclohexane-1,2,4,5-tetraone, 4-terphenylol, 4-terphenyl thiol, terphenyl 4-carboxaldehyde, 4-phenylazophenol, polyacrylic acid (PAA), polyacrylonitirile, polyphenyl methylethanimine (PMI), polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, and/or 2,5-dimethoxybenzene-1,4-dicarboxaldehyde. In some embodiments of the present disclosure, a reactant may include at least one of an alkenyl group, an alkynyl group, a carbonyl group, an aromatic, a halo group, an ester, an ether, an epoxide, a carboxylic acid, a carboxylate, an aldehyde, an alcohol, an alkoxide, a peroxide, an amine, an amide, an imine, an imide, a diimide (azo group), a diazo, a nitrile, a cyanate, a nitroso, an oxime, a nitro, a thiol, a thiolate, a sulfonyl, a sulfonic acid, a sulfonate, a sulfonamide, a phosphonic acid, a thiol carbonyl, a carbene, and/or a phosphonate.

Examples of binders that may be used in some embodiments of the present disclosure may include at least one of polyethylene oxide (PEO), polyvinylidene fluoride, styrene butadiene rubber, polyacrylonitrile, carboxymethyl cellulose, polyacrylic acid (PAA), lithium polyacrylate, Nafion, polyacetylene, polyphenylene acetylene, or polyphenylene imide, polyphenyl methylethanimine (PMI), polynapthalene diimide (PNDI), polythiophene, polyaniline, polypyrole, polyparaphenylene, poly-ether-ether-ketone, and/or polyphenylene sulfide. Examples of conductive materials that may be used in some embodiments of the present disclosure may include at least one of carbon black, an amorphous carbon, a glassy carbon, a single walled carbon nanotube, a multiwalled carbon nanotube, a functionalized carbon nanotube, graphene, graphene oxide, a functionalized graphene oxide, other two-dimensional conductive materials such as transition metal dichalcogenides and MXenes (layered transition metal carbides or nitrides), a carbon fiber, a metal nanowire, and/or a metal nanofoam. In some embodiments of the present disclosure, a conductive material may include an ionically and/or electronically conductive polymeric and/or macromolecular material or mixtures thereof, which may include at least one of π-conjugated polymers, π-conjugated macromolecules, oligomers, doped conducting polymers, copolymers, dendritic polymers, branched polymers, hyperbranched polymers, hypergrafted polymers, network polymers, interpenetrating network polymers, and/or covalent organic frameworks (COFs).

In general, according to some embodiments of the present disclosure, the converting of a starting Si NP or a starting silicon monolith (e.g. Si boule) to a functionalized Si NP may be described as follows. A starting Si NP, having a silicon core, may have a surface that includes a hydride functional group, i.e. a silicon-hydrogen group denoted by $*SiH_x$, where $1 \leq x \leq 3$, and *Si is a silicon atom on an outer surface of the Si NP. The reacting of the reactant with the Si NP may result in the converting of at least a portion of the $*SiH_x$ to produce a functionalized silicon nanoparticle. In some embodiments of the present disclosure, the reacting of the reactant with a starting silicon monolith (versus Si NP) may result in the breaking up the monolith and the converting of a portion of the internal or outer silicon atoms (initially bound to other silicon atoms in the monolith) to outer *Si atoms on a functionalized silicon nanoparticle. A functionalized silicon nanoparticle includes $*SiH_xR_y$, where $0 \leq x \leq 2$ and $1 \leq y \leq 3$, where R is a ligand comprising at least one of —O—R', —C—R', —N—R', —Si—R', or —S—R', and R' is a functional group derived from the reactant. Thus, the reactions described herein describe reactions from both initial outer hydride functional groups and/or initial Si—Si bonds. As described herein, examples of R' include at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, and/or a thiol carbonyl.

Equation 1 illustrates an example of a reaction that may take place between the surface of a silicon core and lithium acrylate as a reactant. This exemplary reaction results in a functionalized Si NP having a surface functionalized with $*SiH_xR_y$, where $0 \leq x \leq 2$ and $1 \leq y \leq 3$, where the ligand R is defined as —C—R' and R' is —$C_2HO_2^-Li^+$. In some embodiments of the present disclosure, the resulting layer of functional groups on the surface of a Si NP may behave as an initial SEI, that may change during subsequent method steps and exposure to other reactants and/or materials (e.g. binder, conductive material, electrolyte), as described above. This exemplary reaction, and similar reactions, may take place during any one or more the processing steps described above: a first step of mixing the starting Si NPs with only the reactant, a second step that includes the use of a catalyst and/or initiator, the forming of an anodic mixture, the thermal annealing to produce a solid anode, during battery fabrication, and/or during battery cycling.

Reaction 1

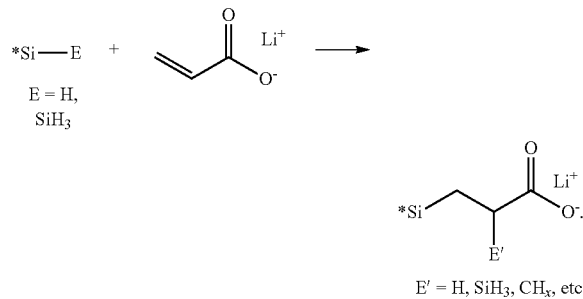

E = H, SiH₃

E' = H, SiH₃, CH_x, etc

*denotes a Si atom at the surface of the silicon core

Equation 2 illustrates an example of a reaction that may take place between the surface of the second layer made of, for example, carbon black, binder, etc. and a reactant, lithium acrylate. This reaction, and similar reactions, may take place during the forming of an anodic mixture, the thermal annealing to form a solid anode, during battery fabrication, and/or during battery cycling.

Reaction 2

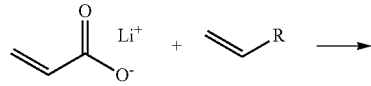

-continued

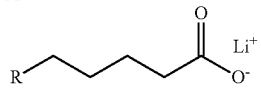

R = polymer, carbon black, etc.

Equation 3 illustrates an example of a reaction that may take place between the surface of an initial first layer (SEI) and a reactant, lithium acrylate. This reaction, and similar reactions, e.g. Reactions 1 and 2, may occur during any of the processing and/or operating steps the Si NPs are subjected to. Thus, during the life of an anode's synthesis and operation, the reactions occurring or absent may wax and wane, in some cases occurring significantly only at specific times and during specific steps, in other cases occurring only slightly during most of the life of the anode, and/or not occurring at all. As described herein, in some cases, multiple reactions may occur simultaneously.

Reaction 3

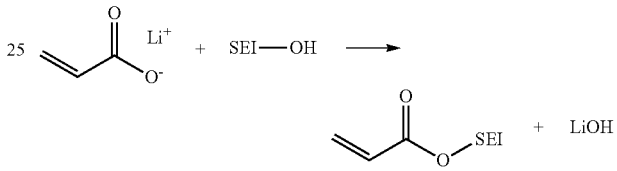

SEI—OH denotes a hydroxyl group (OH) in the SEI

Referring again to FIG. 1A, in some embodiments of the present disclosure, a particle 100A (e.g. Si NP) and/or the particle's core 110 may be in the form of an irregular shaped particle and/or a defined three-dimensional geometric shape such as a sphere, cylinder, and/or any other suitable shape. In some embodiments of the present disclosure, the core 110 may have a characteristic length and/or diameter between 1 nm and 1000 nm. In some embodiments of the present disclosure, the first layer 120 (i.e. SEI) may be a conformal coating, that covers the entire outer surface of the core 110. In some embodiments of the present disclosure, the first layer 120 may cover less than 100% of the outer surface of the core 110. In some embodiments of the present disclosure, the first layer 120 may have a thickness between 0.1 nm and 500 nm. In some embodiments of the present disclosure, the second layer 130 (e.g. containing a binder and/or a conductive material) may be a conformal coating, that covers the entire outer surface of the first layer 120 (i.e. SEI). In some embodiments of the present disclosure, the second layer 130 may cover less than 100% of the outer surface of the first layer 120. In some embodiments of the present disclosure, the second layer 130 may have a thickness between 0.1 nm and 500 nm.

FIG. 1B illustrates another example of a particle 100B, according to some embodiments of the present disclosure. In this example, the particle 100B includes an intermediate layer 140A positioned between the first layer 120 and the second layer 130, with a plurality of ligands and/or functional groups 145, e.g. reactant-derived ligands and/or functional groups positioned within the intermediate layer 140A and connecting the first layer 120 to the second layer 130. In some embodiments of the present disclosure, an intermediate layer 140A positioned between the first layer 120 and the second layer 130 may be an empty space between the first layer and the second layer. In other cases, an intermediate layer 140A may be a partially empty space; e.g. containing empty pores and/or other voids. In an additional example, 140A may be an ionically and/or electronically conductive polymeric or macromolecular material that is mechanically robust and compliant in order to accommodate volume changes during lithiation and delithiation. In still other examples, an intermediate layer 140A may include a mixture of at least one of an element, a molecule, a ligand, a functional group, an additive, a component, a compound, and/or a chemical derived from at least one of the first layer 120 and/or the second layer 130. For example, an intermediate layer 140A may be a solid layer that has a gradient of features (e.g. elements, molecules, etc.) characteristic of the first layer 120 and the outer layer 130: the intermediate layer's features may be more similar to the first layer 120 at the interface between the first layer 120 and the intermediate layer 140A, and more similar to the second layer 130 at the interface between the second layer 130 and the intermediate layer 140A. For example, an intermediate 140A layer may consist of a polymer, macromolecules, or blends thereof, with a gradient in chemical structures or blend ratios across the thickness of the layer. In other words, instead of a simple interface between the first layer 120 and the second layer 130 as shown in FIG. 1A, in some embodiments of the present disclosure, a particle 100B, as shown in FIG. 1B, may include at least one intermediate layer 140A, having a thickness between 0.1 nm and 500 nm, positioned between the first layer 120 and the second layer 130. In some embodiments of the present disclosure, the ligands and/or functional groups 145 of the exemplary particle 100B of FIG. 1B, may at least partially bind the first layer 120 to the second layer 130, by spanning the width of the intermediate layer 140.

FIG. 1C illustrates another embodiment of the present disclosure. In this example, a particle 100C, in addition to a first intermediate layer 140A positioned between the first layer 120 and the second layer 130, the particle 100C also includes a second intermediate layer 140B positioned between the core 110 and the first layer 120 (i.e. SEI). A second intermediate layer 140B, like a first intermediate layer 140A, may contain a plurality of the molecules (only one called out, 145B) connecting the core 110 to the first layer 120. In some embodiments of the present disclosure, a second intermediate layer 140B positioned between an inner layer 120 and the core 110 may be an empty space positioned between these two layers. In other cases, a second intermediate layer 140B may be a partially empty space; e.g. containing empty pores and/or other voids. In an additional example, 140B may be an ionically and/or electronically conductive polymeric or macromolecular material that is mechanically robust and compliant (e.g. flexible) in order to accommodate volume changes during lithiation and delithiation. In still other examples, a second intermediate layer 140B may include a mixture of at least one of an element, a molecule, an additive, a component, a compound, and/or a chemical from the first layer 120 and/or the core 110. For example, the second intermediate layer 140B may be a solid layer that has a gradient of the features (e.g. elements, molecules, etc.) making up the first layer 120 and the core 110: the second intermediate layer's composition may be more similar to the first layer 120 at the interface between the first layer 120 and the second intermediate layer 140B, and more similar to the core 110 at the interface between the core 110 and the second intermediate layer 140B. For example, an intermediate 140B layer may consist of a polymer, a macromolecule, or blends thereof, with a gradient in chemical structures or blend ratios across the thickness of the layer. In other words, instead of a simple interface between the first layer 120 and the core as shown in FIGS. 1A and 1B, in some embodiments of the present disclosure, an exemplary particle 100C as shown in FIG. 1C may include a second intermediate layer 140B, having a thickness between 0.1 nm and 500 nm, positioned between the first layer 120 and core 110. Similar to the example of FIG. 1A, a molecule 145B of particle 100C of FIG. 1C, may bind a first layer 120 to the core 110.

Figure 2:
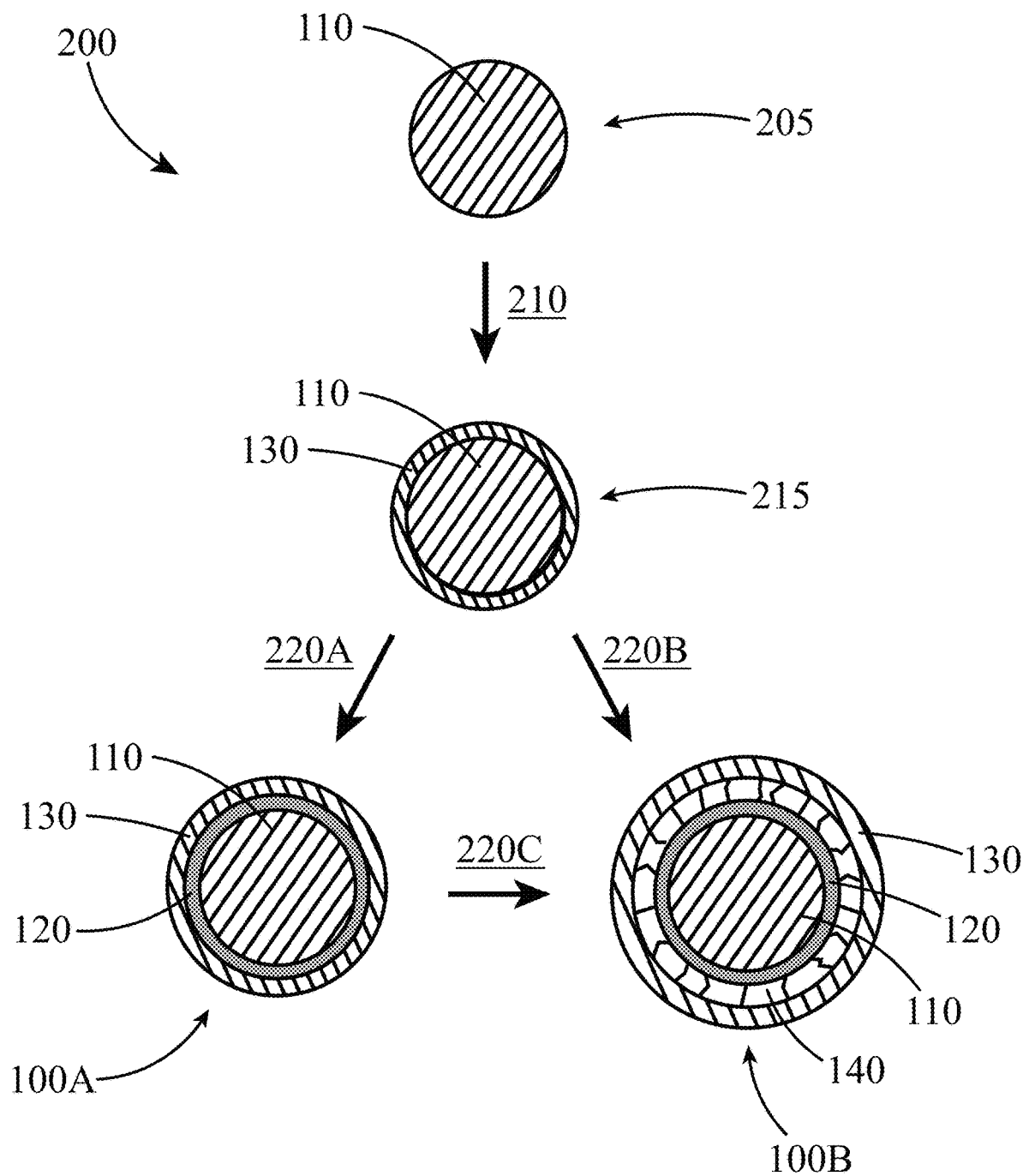
FIGS. 2 and 3 illustrates methods for manufacturing particles as illustrated in FIGS. 1A-1C, according to some embodiments of the present disclosure.
Figure 3:
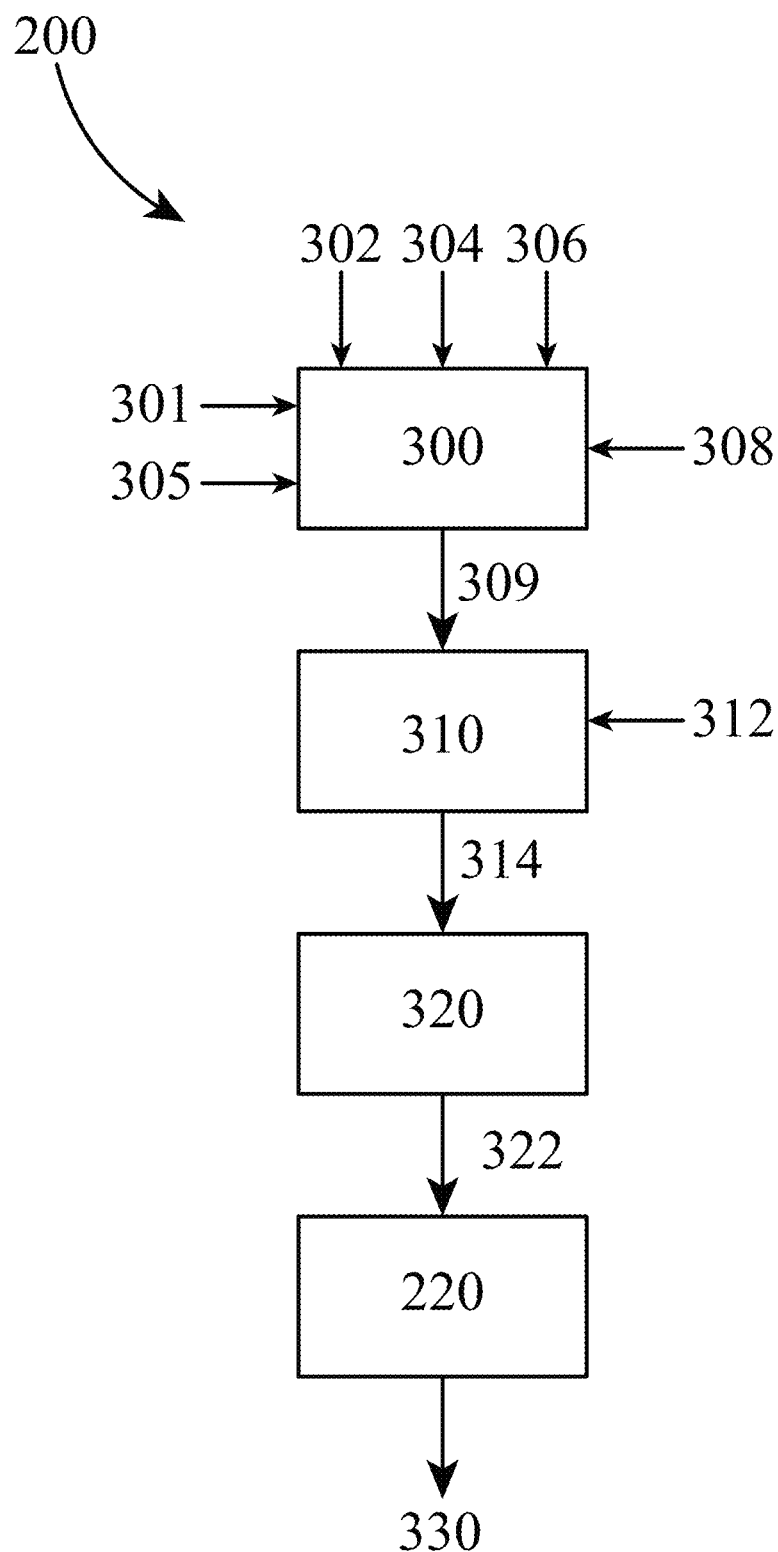

FIGS. 2 and 3 illustrate one exemplary method 200 in more detail, for synthesizing nanoparticles, e.g. Si NPs, as described above (e.g. 100A, 100B, and/or 100C) for eventual use in, among other things, a complete battery, according to some embodiments of the present disclosure. The principles, elements, steps, and/or details described below for the specific methods illustrated in FIGS. 2 and 3 may also be applied to other methods described herein. Referring to FIG. 2, the method 200 may begin with the coating 210 of a starting particle 205 having a core 110 of an active material (e.g. silicon, graphite, etc.) with at least one of a solid, a liquid, and/or a slurry containing at least one of a reactant, a solvent, and/or any other electrode components of interest (e.g. binder, conductive material, etc.). In some embodiments of the present disclosure, the slurry may contain polymer forming agents or mixtures thereof, which may include at least one of aniline, polyacrylonitrile, phenylene diamine, melamine, 1,3,5-triamino benzene, 4,4'-biphenyl diamine, 1,2,4,5-benzentetramine, benzaldehyde, terephthalaldehyde, benzene-1,3,5-tricarboxaldehyde, phenol 4-carboxaldehyde, hexaketocyclohexane, cyclohexane-1,2,4,5-tetraone, polyphenyl methylethanimine, thiophene-2,5-diamine, 2,6-diaminopyridine, 2,5-thiophenedicarboxaldehyde, 2,6-pyridinedicarboxaldehyde, 2,5-furandicarboxaldehyde, napthalene diimide, 3,4-ethylenedioxythiophene, 5,6,11,12-tetraphenyltetracene-2,3,8,9-tetramine, polyethylene glycol, other polymeric monomers, methylethanimine-bridged copolymers, oligomers, polymer chain-terminating agents, polymer solubilizing molecules, polymer linking molecules, polycondensation catalysts, molecular precursors, and/or polymer dopants. A coating 210 step may result in the converting of the uncoated core 110 to a coated particle 215; e.g. a particle having a core 110 substantially covered with a second layer 130, as described above. In some embodiments of the present disclosure, such a second layer 130 may include at least one of a binder, a conductive material, an additive, a reactant, and/or ligands and/or functional groups resulting from one or more reactions occurring between these components. (More detail regarding the coating 210 step is provided below.) Note, that in this example, the second layer 130 is deposited on the starting, hydride-functionalized Si NP before a separate reacting step that converts at least a portion of the hydride groups and/or internal silicon-silicon bonds to other functional groups and before the forming of a first layer 120 (i.e. an initial SEI) are completed. In this example, the first layer 120 (i.e. SEI) forms after the coating 210 of the starting nanoparticles with the anode mixture, i.e. the second coating 130.

Referring again to FIG. 2, a coating 210 step may be a multistep process, that may include, among other things, a thermal annealing (not shown) step and/or a polymer formation step (not shown) to produce a particle having a solid coating. Such a coated particle may be incorporated into a final battery. Regardless of the specifics, after a coated particle 215 is produced, where the coated particle 215 includes an active material core 110 coated with a second layer 130 made of one or more of a binder, a conductive material, an additive, a reactant, etc., the method 200 may proceed with the electrochemical cycling 220 of the coated particle 215, resulting in the formation of a final targeted particle 100, as described above for FIGS. 1A-1C. Among other things, the cycling 220 may result in at least a portion of a material contained in the second layer 130 (e.g. containing binder, conductive material, etc.) reacting to form *$SiH_xR_y$, where R is a ligand comprising at least one of —O—R', —C—R', —N—R', —Si—R', or —S—R', and R' is a functional group derived from the material, as described above, and resulting in the formation of a first layer 120 (i.e. SEI) that is positioned between the core 110 and the second layer 130. In addition, as described above, the cycling 220 may result in the forming of various bonds and/or other interactions between the core 110, the first layer 120, and/or the second layer 130, such that reactant-derived ligands and/or functional groups result in at least the partial binding of the core 110, the first layer 120, and/or the second layer 130 ton one another.

FIG. 2 illustrates that cycling 220 may proceed through at least one or more routes, e.g. 220A, 220B, and/or 220C, to produce final particles 100 like those illustrated in FIGS. 1A-1C. Only particles 100A and 100B are shown in FIG. 2, however, particle 100C of FIG. 1C is also possible, and/or a combination of any of these. In some embodiments of the present disclosure, a coated particle 215, when exposed to the cycling may proceed sequentially through step 220A to a first particle 110A, followed by step 220C to arrive at a second particle 100B. Alternatively, or in addition to, a coated particle 215 may proceed directly to a second particle 100B as a result of cycling 220B. In some embodiments of the present disclosure, other multistep processes may result in Si NPs having SEIs due to a variety of reactions between various materials and/or reactants.

FIG. 3 provides additional details for an exemplary method 200 for synthesizing nanoparticles (e.g. 100A, 100B, and/or 100C) described herein. As described above, the coating 210 step of FIG. 2 may include multiple processing steps. Referring to FIG. 3, processing steps may include, for example, a mixing 300 of various materials such as at least one of an active material 301 (e.g. Si NPs) 301, a reactant 302, a binder 304, a polymer forming agent 305, a conductive material 306, and/or a solvent 308 to form a slurry 309, an applying 310 of the slurry 309 to a current collector 312 to yield an untreated electrode 314, and a treating 320 (e.g. annealing) of the untreated electrode 314 to produce a solid electrode 322 that includes the coated particles 215 as illustrated in FIG. 2 and described above. Finally, the solid electrode 322, once combined with a cathode and electrolyte to fabricate a complete battery, may be exposed to electrochemical cycling 220, resulting in a cycled electrode 330 having final particles 100 with a stable, better performing SEI (i.e. first layer 120), as described above.

Referring again to FIG. 3, in some embodiments of the present disclosure, a method 200 may begin with the mixing 300 of an electrochemically active material 301 (e.g. silicon powder and/or graphite powder), a reactant 302 (e.g. lithium acrylate), a binder 304 (e.g. PAA and/or PVDf), polymer forming agents 305, and a solvent 308 to form a slurry 309. In some embodiments, a solvent 308 may include water and/or a polar aprotic solvent. Examples of suitable solvents include at least one of N-methyl-2-pyrrolidone (NMP), toluene, heptadecane, dihydrolevoglucosenone, tetrahydrofuran, diethyl ether, dimethyl ether, diphenylether, ditert-butyl ether, dioctyl ether, dimethoxy ethane, and/or a glyme. In some embodiments, water may be used as the solvent 308, where the pH of the water may be adjusted to between 2 and 14, or between 3 and 8. In forming the slurry 309, the mixture of active material 301, reactant 302, binder 304, and polymer forming agents 305 in the solvent 308 may be mixed at a temperature between 20° C. and 300° C., or between 70° C. and 90° C., for between greater than one minute and 2 hours, or between greater than 30 seconds and 30 minutes. In addition, and/or after a period of time, a conductive material 306 (e.g. at least one of carbon black and/or a π-conjugated polymer) may be added, followed by additional mixing. The mixture of active material 301, additive 302, binder 304, and polymer forming agents 305, conductive material 306 in a solvent 308 may be mixed at a temperature between 20° C. and 300° C., or between 70° C. and 90° C., for an additional period of time between 30 seconds and four hours. Furthermore, and/or after a period of time, in some embodiments of the present disclosure a vapor-phase or liquid-phase polymer forming agent 305 may be introduced into the electrode. In some embodiments, during this period of time the polymer forming agents 305 may chemically react to form a polymeric material. In some embodiments of the present disclosure, the final composition of the solid materials in the slurry 309 may be between 0% and 80% (mass percent) for the active material 301, between 0% and 20% for the reactant 302, between 0% and 20% for the binder 304, between 0% and 80% for the polymeric material formed from 305, and between 0% and 80% for the conductive material 306. In some embodiments, the mixing 300 to produce a slurry 309 may be carried out under oxygen-free and water-free conditions or under standard atmospheric conditions. In some embodiments of the present disclosure, the mixing 300 may not include at least one of a binder 304, polymer forming agents 305, a conductive material 306, or a solvent 308; e.g. the mixing 300 may only include the starting hydride-functionalized Si NPs and at least one reactant.

As shown in FIG. 3, in some embodiments of the present disclosure, a method 200 for making an electrode 300 may proceed with the applying 310 of the slurry 309 to a current collector 312 to produce an untreated electrode 314 that is coated with the slurry 309. For example, the applying 310 of the slurry 309 to a metallic current collector 312 (e.g. copper) may be accomplished by blade coating or slot dye where the resultant film thickness of the slurry 309 on the current collector 312 may be between 100 nm and 1000 μm, or between 1 μm and 100 μm. The deposition rate of the slurry 309 onto the current collector 312 may be between 0.1 mm/sec to 100 mm/sec.

The method 200 may then proceed with the treating 320 of the untreated electrode 314, resulting in the formation of a solid electrode 322, where, among other things, the solvent 308 is removed from the film on the current collector 312, resulting in the forming of a coated particle 215, as shown in FIG. 2. In some embodiments of the present disclosure, the treating 320 may be accomplished by exposing the untreated electrode 322 to at least one of an elevated temperature (i.e. annealing), and/or pressures below one atmosphere of pressure. For example, the treating 320 may be accomplished by heating the untreated electrode 314 to a temperature equal to or greater than 50° C. and/or by exposing the untreated electrode 314 to pressures below 1 torr, by exposing the electrode to polymer formation agents (e.g. polycondensation catalysts), and/or by facilitating polycondensation through vapor transport and (excess vapor reactant) removal, resulting in the formation of a solid electrode 322.

Referring again to FIG. 3, in some embodiments of the present disclosure, the resultant solid electrode 322 may be used to fabricate a complete battery (not shown). For example, a solid electrode 322 may be utilized as the anode of a battery, combining it with a cathode constructed of at least one of lithium metal and/or an oxide-based intercalation compound containing at least one of nickel, manganese, cobalt, iron, copper, zinc, chromium, vanadium, titanium and/or any other suitable transition metal, and/or a sulfide or oxide based conversion compound containing at least one of nickel, manganese, cobalt, iron, copper, zinc, chromium, vanadium, titanium and/or any other suitable transition metal, and/or a sulfur or polysulfide containing conversion compound (Li-sulfur battery), and/or a membrane electrode allowing access to reactive oxygen from the air (Li-air battery). The complete battery may be manufactured by combining the cathode and the anode with an electrolyte, for example a mixture of $LiPF_6$ with ethylene carbonate and ethylmethyl carbonate, where the ethylene carbonate and the ethylmethyl carbonate may be present at a ratio of about 3:7. The electrolyte mixture may also contain other carbonates such as fluoroethylene carbonate, may be based on ether solvents such as dimethylether, may contain other lithium salts such as lithium bis(trifluoromethane)sulfonamide (LiTFSI), and/or may contain other additives such as phosphonates, etc. In some embodiments of the present disclosure, an electrolyte may consist of a solid electrolyte material, which may contain sulfide compounds (e.g. Argyrodite), lithium thiophosphate compounds, metal oxides (e.g. garnet structured materials), lithium phosphorous oxynitride (LIPON), or polymers (e.g. polyethylene oxide).

Finally, as described above, the battery (not shown), containing the anode including the coated particles 215 may be exposed to a cycling 220 step to produce a cycled electrode 330, where the cycled electrode 330 contains the final targeted particle 100, having at least a core 110 of active material (e.g. silicon, graphite, etc.), a stable SEI (i.e. first layer 120), and a second layer 130, where reactant-derived ligands, polymers, and/or functional groups physically bind these features together. In some embodiments of the present disclosure, a solid electrode 322 (in a complete battery) may be electrochemically cycled between 1 and 10 times, or between 1 and 5 times, at a rate between C/40 and 1 C, or between C/20 and C/10 (where 1 C is defined as the current required to charge or discharge the battery completely from its discharged or charged state in one hour) from a starting voltage greater than or equal to 0.1 V, or greater than or equal to 2 V, or between 0.01 V and 10 V versus lithium as a reference electrode, to an ending voltage greater than or equal to 0.1 V, or greater than or equal to 2 V, or between zero V and 10 V versus lithium as a reference electrode. In some embodiments of the present disclosure, the ending voltage may be between zero V and 0.05 V versus lithium as the reference electrode, which may result in completely, or nearly completely lithiated silicon ($Li_{15}Si_4$) after the first three cycles. Following the initial three cycles at C/20, the electrode may be cycled at any rate between 10 C and C/100. The C-rate is the measure of the rate at which one charges the battery. As used herein, a 1 C rate is defined as conducting a full charge or discharge in 1 hour. A 2 C rate is thus fully charging or discharging in 30 minutes, whereas a C/5 rate is over 5 hours and C/20 is over 20 hours. As used herein a "fast charging" refers to a complete charge with a time period between about 10 minutes and about 15 minutes for fueling vehicles, which translates to a 4 C or 6 C rate.

There are several performance metrics that may indicate that a particle, an anode, and/or a battery, as described herein, has been manufactured using the methods described herein. Important performance metrics for the energy and/or power density of an anode or battery is the reversible capacity as a function of the battery's cycle number. Typically, one wants the reversible capacity to remain as high as possible for as many cycles as possible. See below for examples and reference figures of the effect of various Si NP surface treatments on the anode's reversible capacity as a function of cycle number. Another important metric is the coulombic efficiency (CE) for any given cycle of the anode and/or battery. The CE is the percentage of electrical charge passed during a charging of the battery that is recovered on its subsequent discharging. The coulombic efficiency indicates how much of the charge passed during cycling is reversible and is a proxy to the efficacy of the SEI layer at preventing irreversible side reactions. For an anode to exhibit high reversible capacities for hundreds to thousands of cycles in a full-cell battery, the CE must exceed 99.5%. It is especially important for the CE to rise to these high values very early on in its cycling, typically in the first few cycles, as the CE is typically low <99% during the first few cycles, as the SEI is formed and passivates against further irreversible side reactions. See below for examples and reference figures of the effect of various Si NP surface treatments on the CE.

Figure 4:
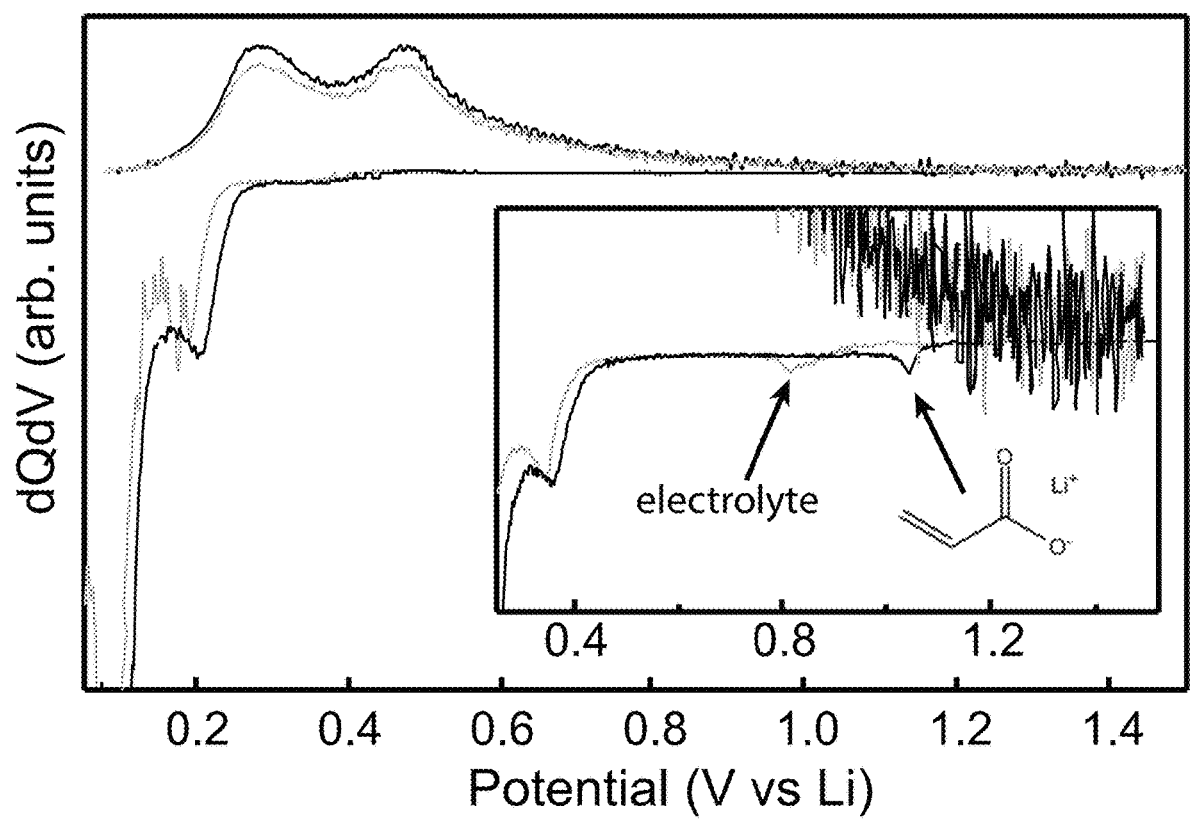
FIG. 4 illustrates a differential capacitance plot (cyclic voltammetry) of silicon-based half cells being cycled against lithium metal with (dark data set) and without (lighter data set) lithium acrylate as an additive. The inset shows the electrochemical events that correspond to the reduction of lithium acrylate. (Electrolyte reduction—a surface that has not been passivated.)
Figure 5:
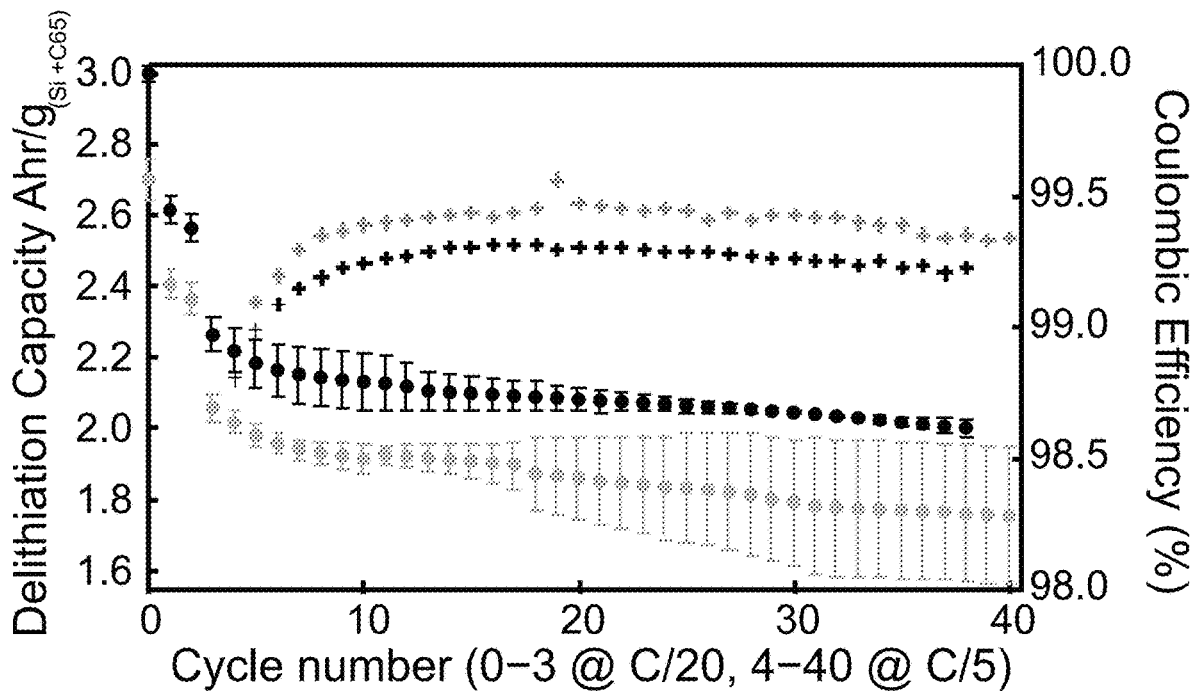
FIG. 5 illustrates electrochemical cycling of silicon-based electrodes with (dark data sets) and without (lighter datasets) lithium acrylate added into a slurry prior to electrode fabrication. These data are the average of three different half cells with lithium metal as the cathode and the error bars are ±1σ from the mean. The cells were cycled between 1.5V and 0.01V vs Li (reference electrode) at a rate of C/20 for the first three cycles and C/5 for the remaining cycles. The average coulombic efficiencies for these electrodes are also shown as plus-symbols (same grayscale as the data set with circles) and plotted corresponding to the right axis.

FIG. 4 illustrates another performance diagnostic tool, differential capacitance (dQdV). The differential capacitance (dQdV) plot of lithiation of the first cycle of an anode prepared as described above, displays a redox event more positive than 0.8 V versus a lithium reference electrode, indicating that the first layer (i.e. SEI), in this example modified using lithium acrylate reactant, is being selectively reduced to at least one of the surface of the core (the active material) and/or any of the layers around the core. This characteristic is further displayed in the inset of FIG. 4. Another indication of an improved SEI at the SiNP core's surface is the absence of a redox feature at 0.8V in the dQdV plot. The absence of this feature is an indication of the reactant's (and/or molecules resulting from the reaction of the additives) passivation of the active materials' (i.e. the core) surface against electrolyte reduction. Referring to FIG. 5, another indication of an improved first layer (i.e. SEI) is an increase in the resultant battery's charge storage capacity and a slightly reduced degradation rate with continued cycling.

Figure 6A:
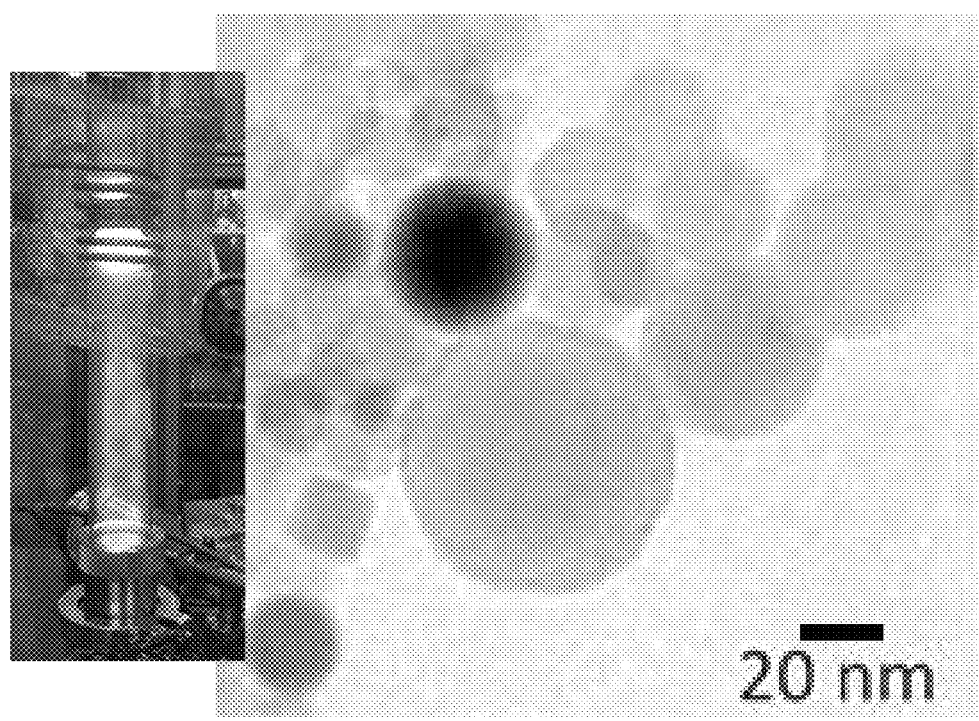
FIG. 6A illustrates a photograph of an ICP plasma process overlaid on a TEM image of silicon nanoparticles produced using the ICP plasma process, according to some embodiments of the present disclosure. Average Si NP size was about 24.5±7.0 nm.

An aspect of the present disclosure relates to the reliable and repeatable synthesis of starting Si NPs that can be used to produce anode materials, solid anodes, and complete batteries as described above. Therefore, the present disclosure also relates to silicon nanoparticles (Si NPs) produced via nonthermal plasma synthesis, which may be subsequently fabricated into electrodes, e.g. anodes as described above, for next-generation lithium-ion batteries. Plasma synthetic methods were used to synthesize the Si NPs, with a representative method described in *Chem. Rev.*, 2016, 116 (18), pp. 11061-11127, which is incorporated herein by reference in its entirety. In some embodiments of the present disclosure, Si NPs were synthesized using capacitively-coupled plasma (CCP) or inductively-coupled plasma (ICP). Using CCP, the Si NP average diameter could be controlled to a range between 3 nm and 20 nm. ICP has been shown by the production of one characterized sample to be able to produce Si NPs having average diameters of about 25 nm (see FIG. 6A). One objective of this work was to grow larger diameter Si NPs, and it was anticipated that ICP and/or microwave plasma may achieve the synthesis of Si NPs having diameters between 100 nm and 200 nm. The Si NP size determines the Si NP surface/volume ratio, and particles having diameters of about 100 nm mitigate the reactive surface area relative to the ability of the nanoparticle to engage in lithiation. Lithiation to produce $Li_{15}Si_4$ alloy (3579 mAh $g^{-1}$ theoretical capacity) results in significant volume expansion, up to 280% relative to Li-free Si, causing significant material stress mechanical and electrical failure. The nanoscale size additionally mitigates the possibility of such failure. As demonstrated herein, a nonthermal plasma method can be tuned to prepare pure Si NPs or doped (i.e., containing boron (B), phosphorus (P), etc. atomic doping atoms) Si NPs. In addition, the Si NPs may be at least one of a single crystalline phase, a polycrystalline phase, and/or an amorphous phase.

As described above, one of the major limitations to Si/Li alloy anodes is the instability of the solid electrolyte interphase (SEI), which may be comprised of organic and inorganic products at the surface of the anode. The SEI, as described above, may also be at least partially derived from the electrolyte (typically, $LiPF_6$ in carbonate solution such as ethylene carbonate, dimethyl carbonate, diethyl carbonate, ethyl methyl carbonate, propylene carbonate, fluoroethylene carbonate, etc.), the active material (e.g. silicon), and/or impurities (silicon oxides $SiO_x$ on the Si anode material surface, trace water in electrolyte, etc.).

As described herein, the present disclosure relates to a process to synthesize, chemically modify, and process Si NPs into, among other things, Li-ion battery anodes air-free, which, as shown herein, mitigate the instability of the SEI. Si NPs were prepared via the aforementioned nonthermal plasma process, which contain hydrogen-terminated surfaces and very little surface oxide impurity. The as-grown Si NPs were further processed using radical-based chemistry as described in Chem. Mater., 2015, 27 (19), pp. 6869-6878 and Nano Lett., 2018, 18 (05), pp. 3118-3124, which is incorporated herein by reference in its entirety. A wide variety of surface-functionalized (also termed simply functionalized) Si NPs, defined by $*SiH_xR_y$, as described above, can be prepared using this route. In the exemplary electrodes used to generate the coin cell battery data in FIGS. 7A and 7B, as-grown, single crystalline, undoped Si NPs were heated in N-methyl-pyrrolidone (NMP) in the presence of a radical initiator, which resulted largely in hydrosilylation and/or silylsilylation reaction(s) across the NMP carbonyl (C=O) group to produce a functionalized Si NP with a *Si—O—C(H/SiH_3) bond.

Figure 6B:
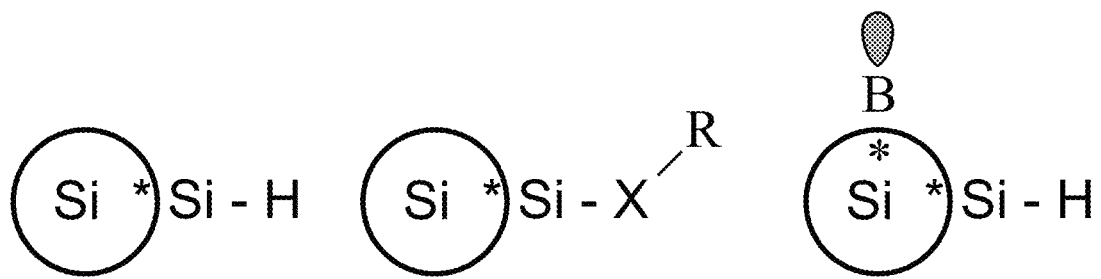
FIG. 6B illustrates different types of silicon nanoparticles (Si NPs) accessible via the nonthermal plasma process illustrates in FIG. 6A and its functionalization via a radical-based process to create surface silicon-X bonds, where X may include at least one of O, C, N, S, Si, etc., according to some embodiments of the present disclosure.
Figure 6C:
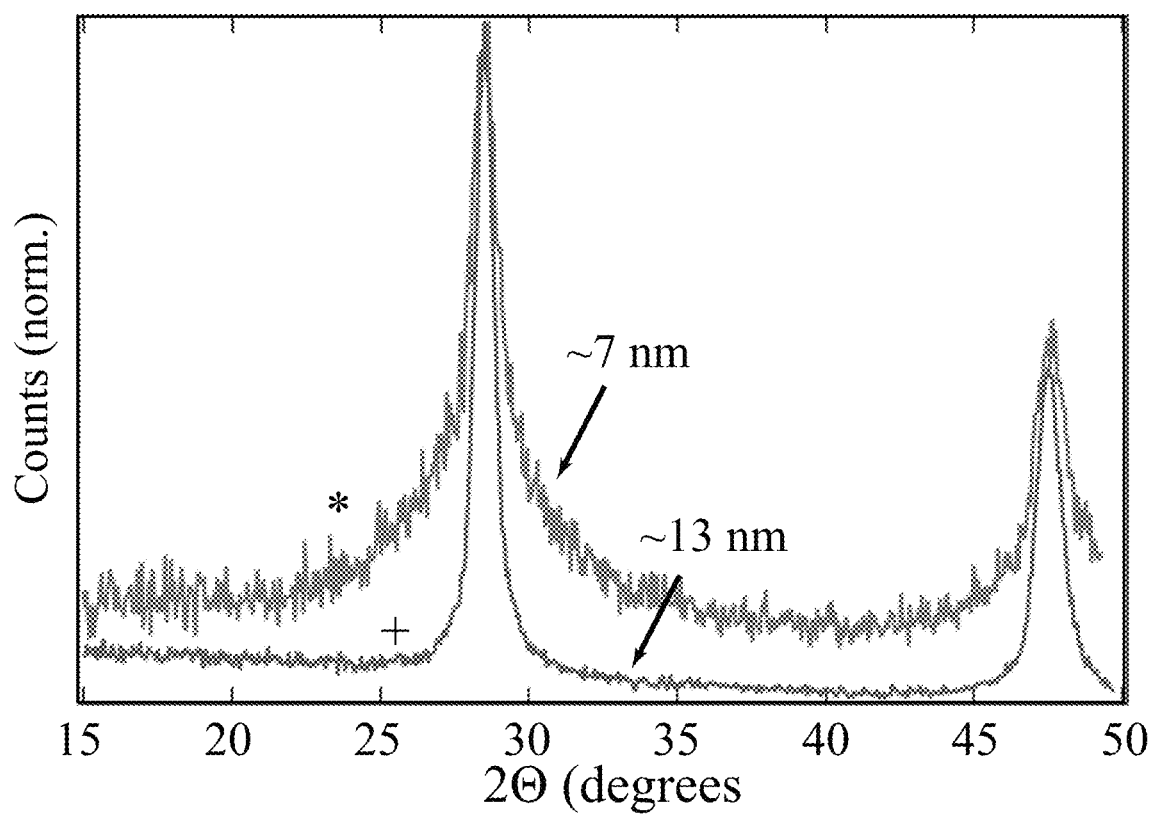
FIG. 6C illustrates X-ray diffraction (XRD) characterization of capacitively-coupled plasma prepared (CCP-prepared) Si NPs, according to some embodiments of the present disclosure. * data set is for argon plus 10% $SiH_4$ in helium; + data set is for argon plus 100% $SiH_4$.
Figure 6D:
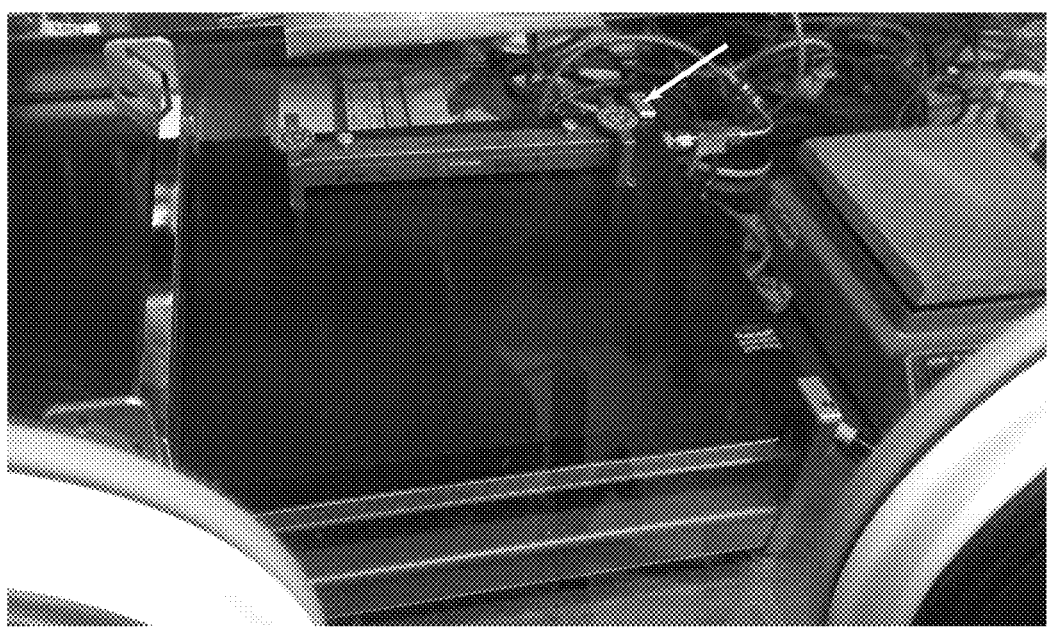
FIG. 6D illustrates equipment used to fabricate electrodes via wet chemical methods (shown is blade casting) under air-free conditions, according to some embodiments of the present disclosure. Slurries were blade cast onto copper current collectors and subsequently dried at 150° C. in a nitrogen-filled glove box. The arrow indicates the drying plate.

The radical reaction in NMP resulted in functionalized Si NPs that were subsequently incorporated into battery electrodes. Again, a variety of surface chemistries, in addition to NMP-functionalized Si NPs, may be implemented. In some embodiments of the present disclosure, a slurry in NMP (or other suitable air-free) solvent was prepared using functionalized Si NPs (between 1 wt % and 90 wt %), conductive carbon (between 1 wt % and 90 wt %; here, commercial Timcal C45), and polyacrylic acid (PAA; between 1 wt % and 50 wt %) in a variety of ratios. All reagents were purified prior to use. The slurry was then cast onto a copper current collector and dried under an inert gas atmosphere (see FIG. 6B). The air-free, inert-atmosphere dried electrode was then dried further under vacuum and fabricated under an inert atmosphere into coin cell batteries using the following configuration: the functionalized Si NP-containing electrode, a commercial Celgard separator wetted with electrolyte, here, 1.2 M $LiPF_6$ in ethylene carbonate/ethyl methyl carbonate, 3:7 w/w; termed Gen2 electrolyte with or without fluoroethylene carbonate (FEC)), and a lithium metal ($Li^0$) foil counter electrode. This so-called half-cell configuration was then cycled between charge and discharge cycles to generate the data illustrated in FIGS. 7A and 7B. Preliminary capacity data on a per gram Si basis (~2,400 mAh $g^{-1}$) exceeded that (~1,500 mAh $g^{-1}$) from a similar process conducted on plasma-prepared, hydroxyl group-terminated and polyaniline hydrogel-functionalized Si NPs where functionalization chemistry was conducted in air.

Figure 7A:
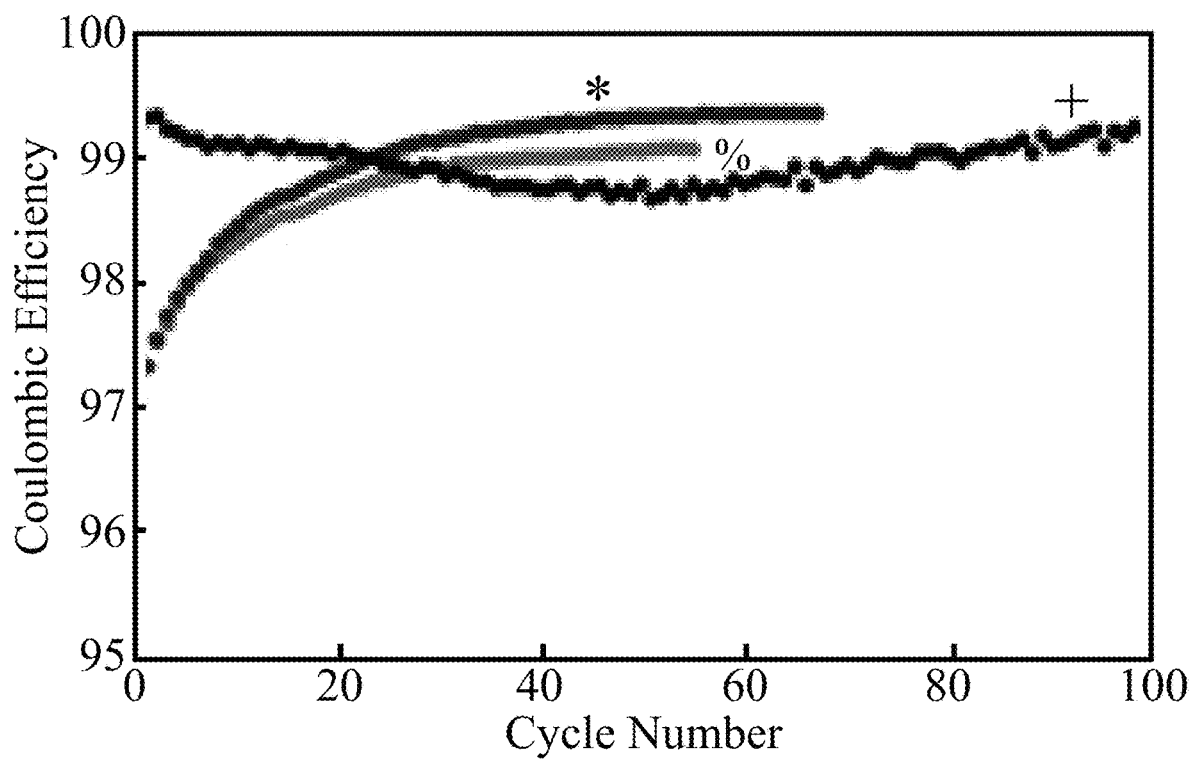
FIG. 7A illustrates Coulombic efficiency (CE) data for the cycling data shown in FIG. 7B, according to some embodiments of the present disclosure. CEs are at the last data point. * corresponds to 7 nm Si NPs (1:8 Si:C45) with CE=99.4%; + corresponds to Paraclete (7:1 Si:C45) with CE=99.2%; and %=7 nm Si NPs (1:3 Si:C45) with CE=99.1%.
Figure 7B:
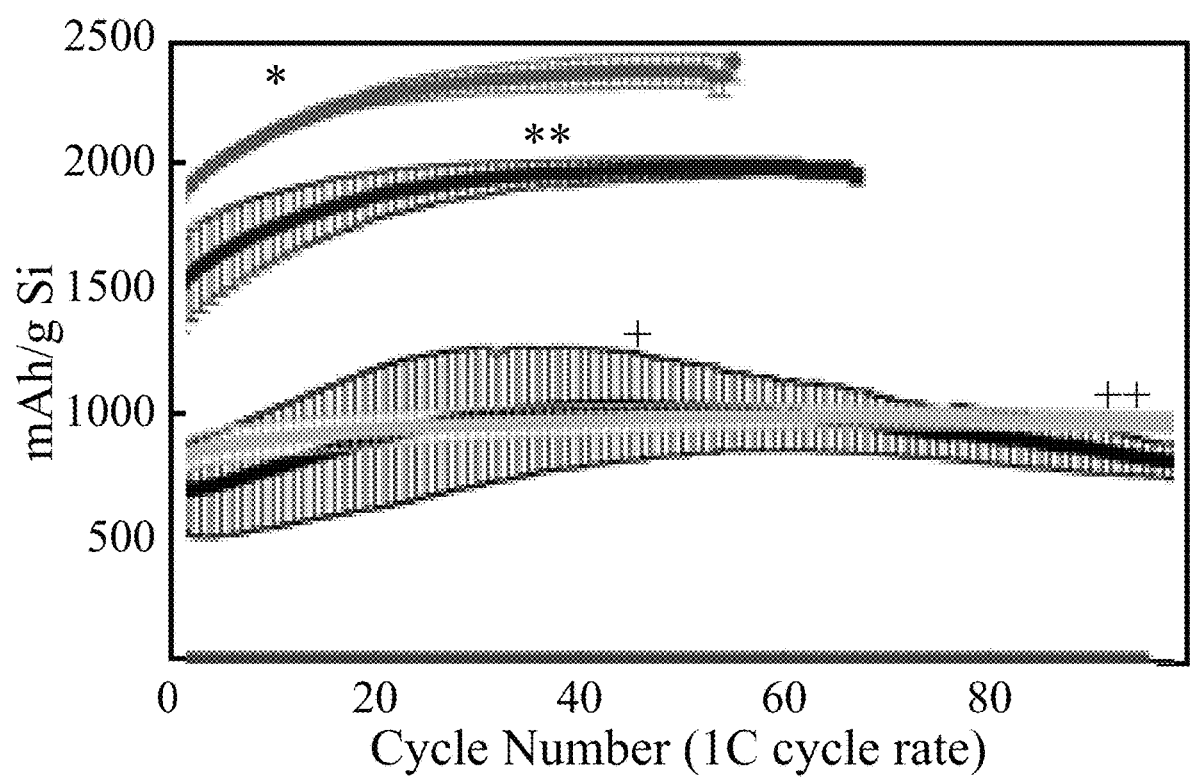
FIG. 7B illustrates capacity data collected from 1.5 V to 0.05 V vs $Li^+/Li^0$ at 1 C rate for half-cell batteries prepared from plasma-prepared, air-free processed Si NPs at various ratios of Si NPs:C45 conductive carbon compared with that from similarly-prepared commercial Si NPs from Paraclete, according to some embodiments of the present disclosure. * corresponds to 7 nm Si NPs (1:3 Si:C45); ** corresponds to 7 nm Si NPs (1:8 Si:C45); + corresponds to Paraclete (7:1 Si:C45); and ˆ corresponds to 7 nm Si NPs (7:1 Si:C45).

Remarkably, the Coulombic efficiency (discharge capacity/charge capacity×100), a measure of the degree of Faradaic (or productive) electrochemical reactions, continuously increased with the air-free Si NP electrodes, reaching 99.1-99.4% after ~70 cycles with a positive slope suggesting that the Coulombic efficiency may continue to increase with additional cycling and/or optimization (see FIG. 7A). Commercial Li-ion batteries have stabilized Coulombic efficiency of 99.99%. The high capacity at fast charge/discharge rates (1 C, or full charge/discharge over 1 h), is especially impressive given that conventional Si NP batteries typically are cycled much slower (on the order of ~0.1 C) to mitigate non-Faradaic processes. Thus, some embodiments of the present disclosure may have applications in portable power, including cell phones and laptops, but also in transportation including fast charging of vehicles.

Figure 8A:
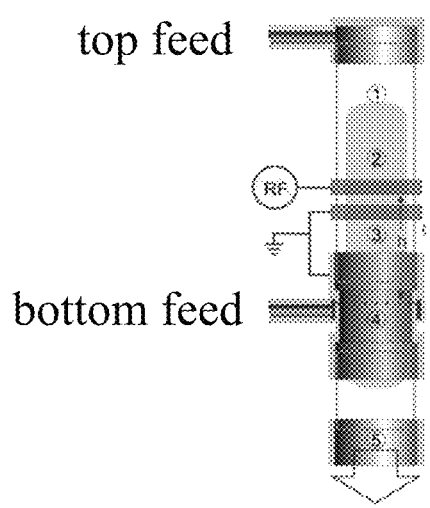
FIG. 8A illustrates a nonthermal plasma growth process for preparing Si NPs, according to some embodiments of the present disclosure. In this example, the top feed was set to about 90 sccm of 10% $SiH_4$ with the remainder helium with an additional 80 sccm of argon. The bottom feed was to about 120 sccm of pure $SiH_4$.
Figure 8A:
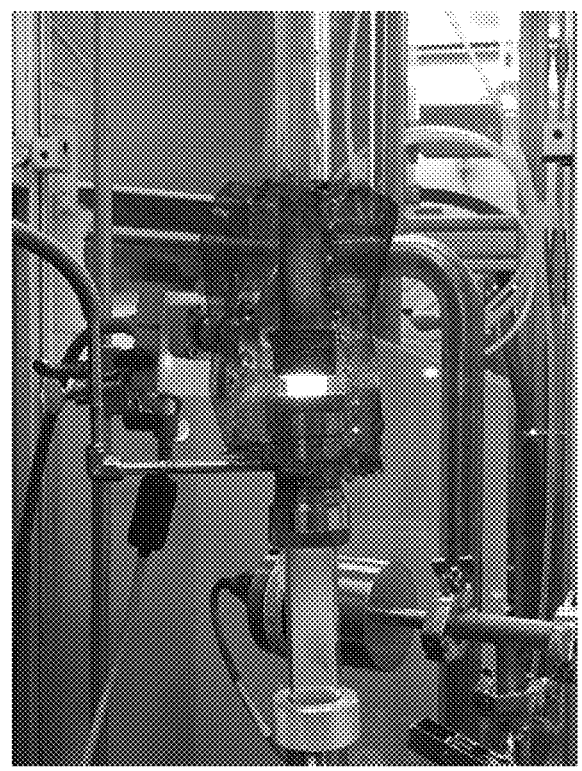
Figure 8B:
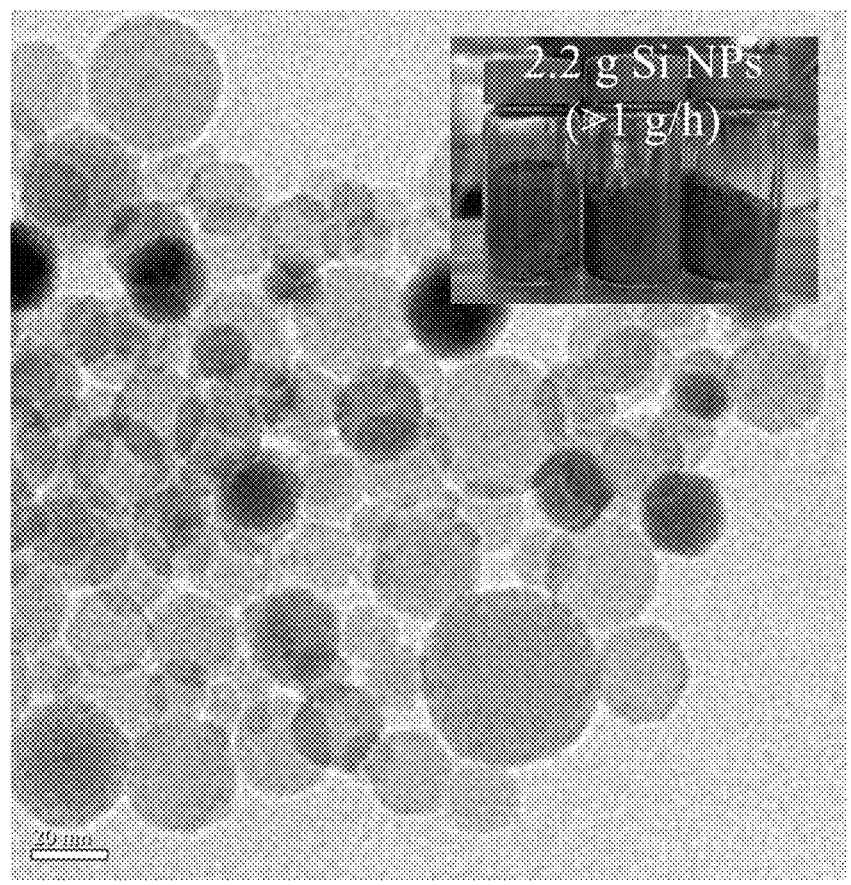
FIG. 8B illustrates 30 nm diameter Si NPs at gram scale, prepared used the process illustrated in FIG. 8A, according to some embodiments of the present disclosure.

An aspect of the present disclosure is an entirely air-free route for producing Si NP-based composite anodes in which the composition of the surface $*SiH_xR_y$ may be adjusted in part or in full to $SiO_x$-terminated, where $SiO_x$ indicates any form of dry or hydrous silicon oxide where $0 \leq x \leq 2$. Air-free Si NP batteries are enabled by, among other things, Si NP production by nonthermal plasma synthesis. In some embodiments of the present disclosure, a process included a gas stream blend and a secondary injection system to add material to the Si NP surface (see FIG. 8A). This enabled the production of 30 nm diameter Si NPs in gram-scale quantities (see FIG. 8B). These were incorporated into various studies on both the inorganic chemical interface, detailed below, as well as the chemistry at the Si NP interface (included the (Re)engineering of the Si/electrolyte interface via molecular interactions section).

Figure 9A:
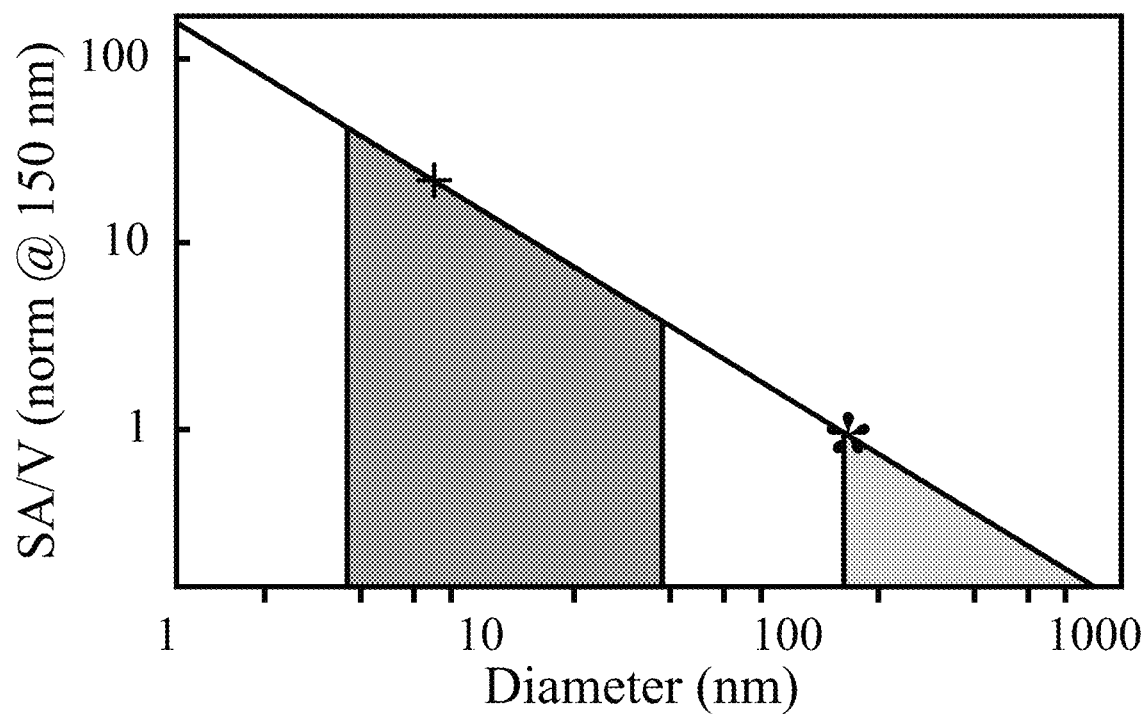
FIG. 9A illustrates how the C65/Si ratio increases as the Si NP size decreases to ensure an electrical percolation network for active anode material as the surface area/volume ratio increases, according to some embodiments of the present disclosure. + corresponds to plasma-produced Si NPs; * corresponds to Paraclete (CAMP).
Figure 9B:
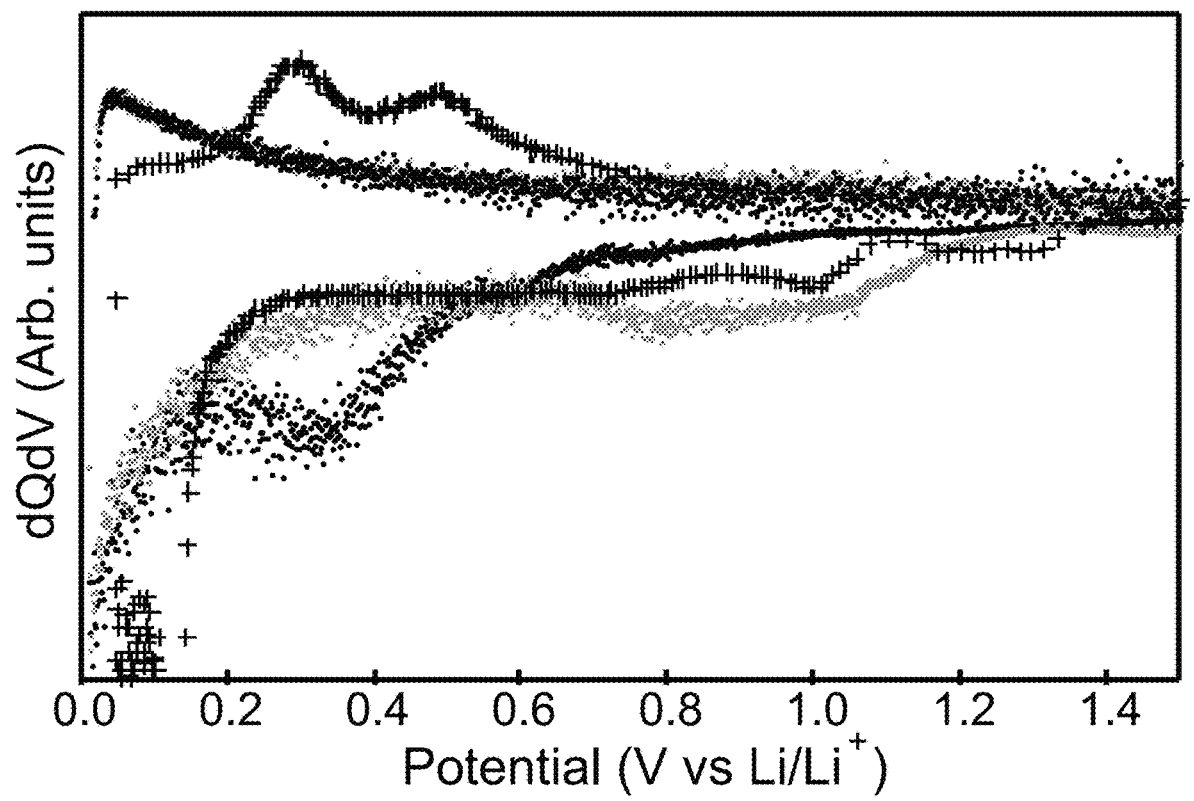
FIG. 9B illustrates normalized dQdV versus the potential plot of the $1^{st}$ cycle of the same samples of FIG. 9A showing that only the air-free processed Si NP electrode undergoes reversible lithiation and delithiation, whereas $SiO_2$ electrodes do not exhibit reversible lithiation, according to some embodiments of the present disclosure. Legend: black circles—Timcal C65 only; light circles 25% 7 nm $SiO_2$/75% C65; pluses—20% 7 nm Si NP/80% C65. All percentages by mass.
Figure 9C:
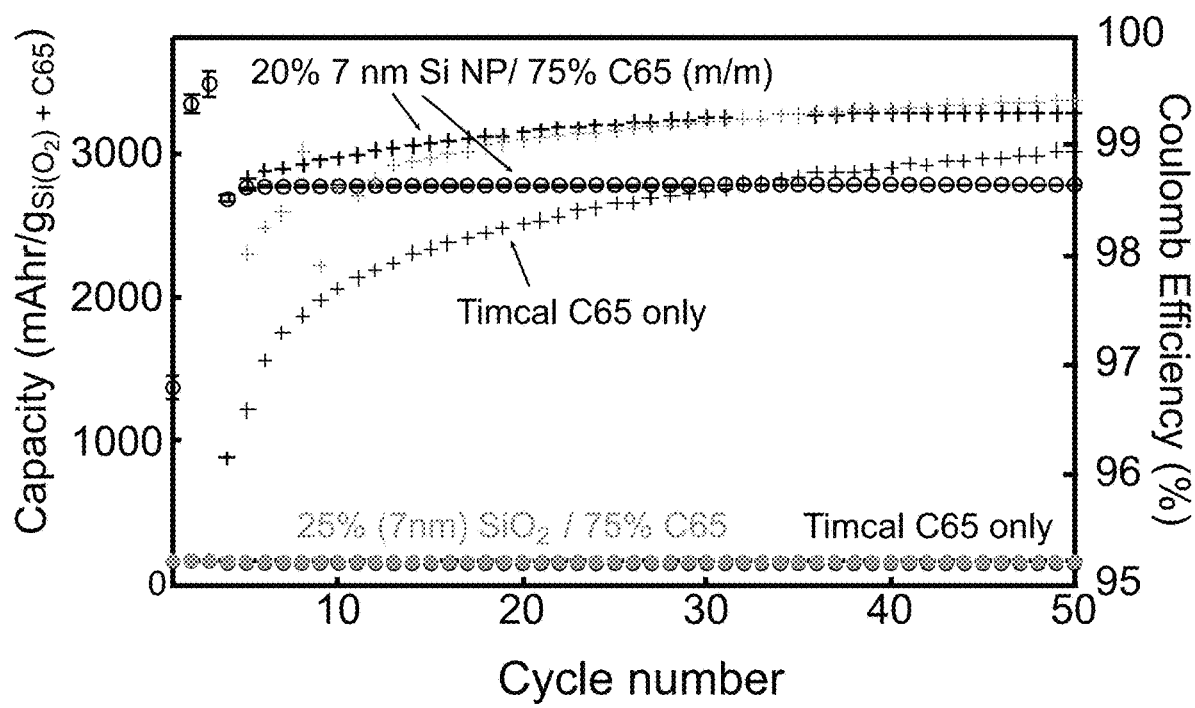
FIG. 9C illustrates capacities (plus symbols) and Coulombic efficiencies (circles) of half-cell anodes made from plasma-grown Si NPs (darker data sets) fabricated air-free using NMP solvent or (lighter data sets) in air using $H_2O$ solvent, according to some embodiments of the present disclosure.

In these examples, electrode slurries were prepared using in-house purified polyacrylic acid (PAA) binder and dried Timcal C65 conductive carbon in purified N-methyl-2-pyrrolidone (NMP) solvent. Slurries of plasma-grown 3.9-35 nm average diameter Si NPs contained 1:4:2 Si:TimcalC65:PAA. The low Si/C65 ratio ensured an effective electrical percolation network with smaller NP diameters (since percolation scales inversely with NP size, see FIG. 9A. To briefly summarize the results: It was determined that processing Si NPs in water resulted in significant surface oxidation (penetrating at least 3 nm into the particle) and that the $SiO_x$ formed was electrochemically inactive toward lithiation/delithiation as evidenced by the lack of a delithiation peak in the dQdV plots in water-processes electrodes (see FIG. 9B). For air-free Si NPs with no oxide, the capacity fade rate was minimal, with >99.0% Coulombic Efficiency (CE) from cycles 20-100 (see FIG. 9C). The asymptotic increase in the CE suggests the Si NP active material was becoming better passivated against undesirable and non-reversible chemical reactions during cycling.

Building from this knowledge, a first optimizing of the air-free slurry fabrication process was completed, which provided normal electrochemical behavior. This optimized slurry processing allowed the study of the capacity fade rate of Si NP anodes with and without surface $SiO_x$ for a series of Si NP sizes. Through these experiments, the effects of chemical ($SiO_x$) and mechanical stress (Si NP size) on capacity fade could be deduced. In addition, a detailed impedance spectroscopy analysis of the SEI layer for Si NPs with and without surface oxide was completed.

Figure 10A:
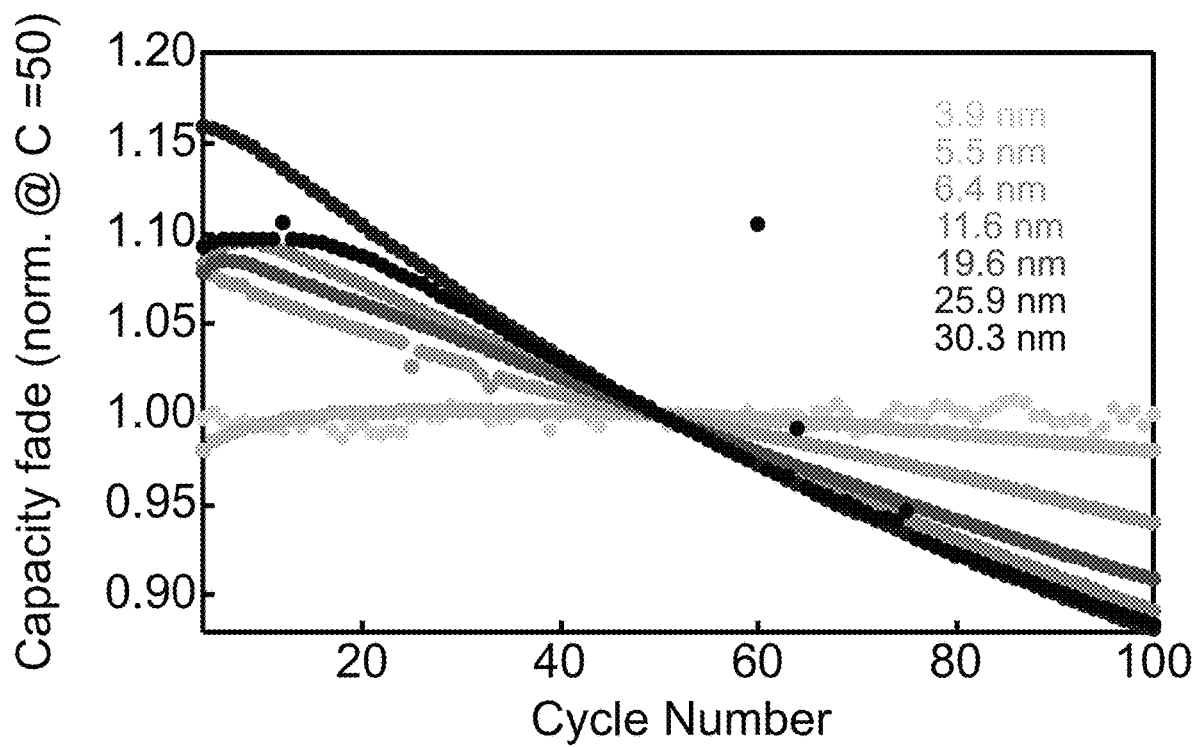
FIG. 10A illustrates normalized cycling data for a range of $SiH_x$-terminated Si NP anodes, according to some embodiments of the present disclosure. The data here have been normalized to their capacity at cycle number 50.

FIG. 10A shows the normalized capacity at cycle 50 using a C/5 rate for Si NP ranging from 4 nm to 35 nm in diameter. The gravimetric capacities of these anodes ranged between ~1700-2500 mAhr $g^{-1}$ Si, and there was no obvious dependence of gravimetric capacity on NP size. The range of capacities is likely related to the electronic charge percolation throughout the entire electrode being dependent on the Si NP size resulting in varying fractions of active material being electrochemically active. Therefore, the capacity data were normalized to highlight the important dependence of the capacity fade rate on the Si NP size. From FIG. 10A, it is clear that the smallest 3.9 nm diameter Si NPs displayed the flattest curves and exhibited virtually no change in capacity over 100 cycles. At Si NP diameters >10 nm (13-35 nm), the largest 35 nm diameter Si NPs displayed the steepest curves, but all Si NPs in this size regime showed very similar fade rates, as the traces of each are nearly superimposable on each other. To further analyze this data, the traces in FIG. 10A (starting from cycle 20) were fit to a linear function in order to extract an average capacity-fade-rate-per-cycle for each of the SiNP sizes measured. These data are shown in FIG. 10B.

Figure 10B:
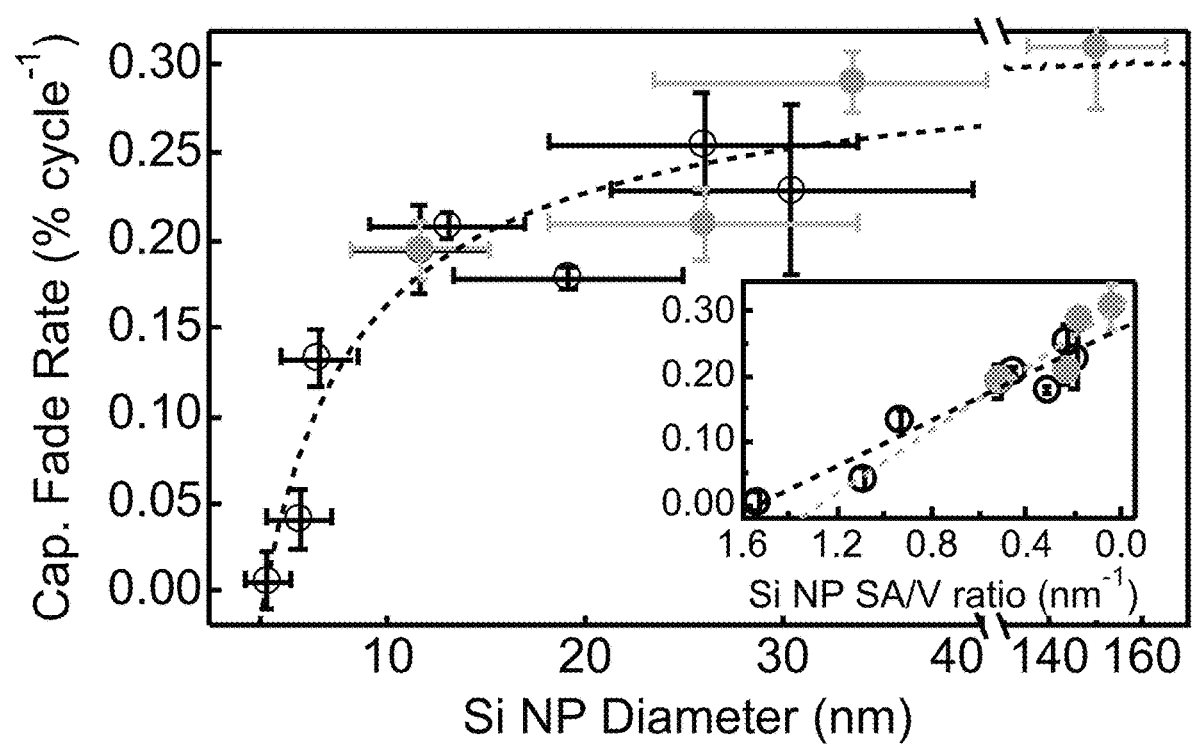
FIG. 10B illustrates a scatter plot of the average capacity fade rate as determined by fitting the last 50 cycles of each of the different diameter Si NP-based anodes, according to some embodiments of the present disclosure. The data with the open circles represent silicon with $SiH_x$-termination and the filled circles are those from oxidized ($SiO_2$) Si NPs. The dashed lines are a power function fit to the $SiH_x$-data with the form cap. fade=$ax^n$+b where x represents the Si NP diameter. The inset is the same data plotted as a function of Si NP surface area-to-volume (SA/V) ratio.

From FIG. 10B, the smallest diameter Si NPs demonstrated the lowest fade rate and the largest Si NPs the fastest fade. From this plot, however, the trend is clearly not linear—as the Si NP size increases, the capacity fade rate appears to approach a horizontal asymptote. Thus, this scatter plot was fit with a sub-linear power function, dashed line in FIG. 10B, where the exponent was 0.75. The fade rate is likely related to the surface-area-to-volume ratio. When the same data were plotted against their SA/V (see the inset of FIG. 10B), the data fall on a linear fit, which suggests that the origin of capacity fade is a combination of chemical (surface area, SEI) properties and mechanical (volume expansion/contraction) properties of the electrode. Next, additional experiments were performed on water-processed Si NPs that had a $SiO_x$ shell. Interestingly, these $SiO_x$-terminated Si NP samples overlay perfectly on the same exponential fit as the $SiH_x$-terminated Si NPs, suggesting that for these plasma-derived Si NPs, surface oxidation had no effect on the capacity fade rate. Another surprising result was found with Paraclete Si NPs, where these heavily oxidized $SiO_x$/Si NPs also fell on this curve. This result suggests that regardless of the initial inorganic interface, the same capacity fade resulted under these conditions.

Figure 11A:
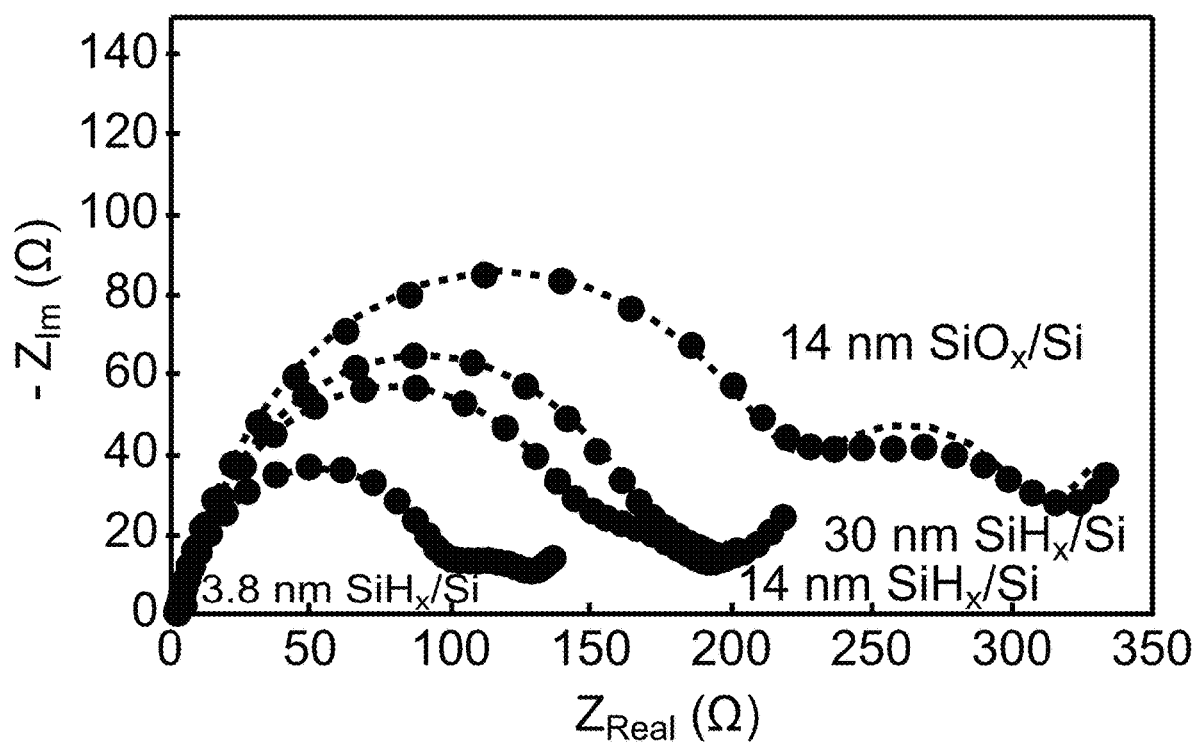
FIG. 11A illustrates representative Nyquist plots for Si NP-based anode half-cells with and without an intentionally grown surface oxide ($SiO_2$) layer, according to some embodiments of the present disclosure.

Next, the electronic properties of the SEI with and without surface oxidation on the Si NPs were evaluated. Electrochemical impedance spectroscopy (EIS) analysis of these composite anodes were conducted at three different states of charge after the first formation cycle ($2^{nd}$ cycle delithiation). FIG. 11A shows the Nyquist plots for 11.6 nm Si NP anodes with and without surface oxidation as well as the equivalent circuit used to model these data. In these measurements there are three distinct processes occurring at different timescales. The fastest process is double layer charging ($CPE_{DL}$) and electrical resistance associated with electron propagation at the surface ($R_{Surface}$). As expected, the $SiO_x$ surface has a much higher $R_{Surface}$ that the $SiH_x$-terminated Si NPs. The second process is associated with ion-conduction through the SEI ($R_{SEI}$) and SEI capacitance ($CPE_{SEI}$). This process occurs on the 1-100 ms timescale. The third process is lithium diffusion in silicon and is accounted for with a Warburg circuit element.

Figure 11B:
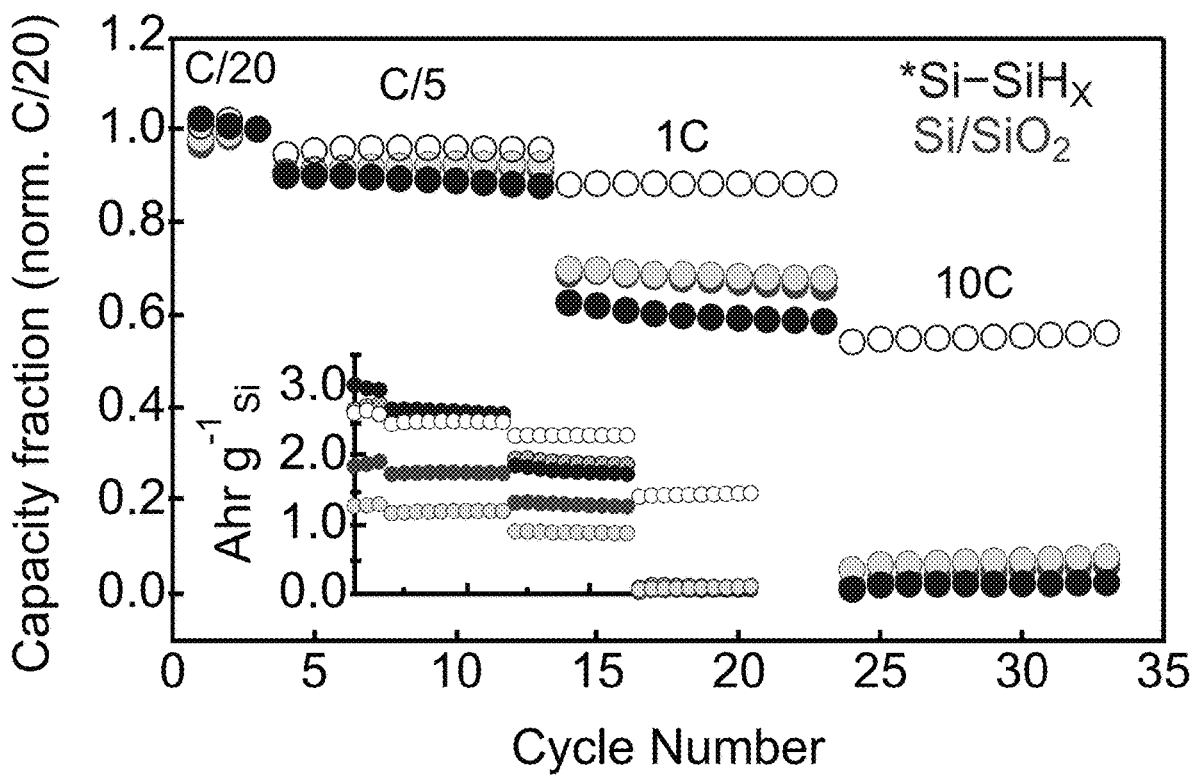
FIG. 11B illustrates normalized scan-rate-dependent data for $SiH_x$— and $SiO_2$— terminated Si NPs of different sizes, according to some embodiments of the present disclosure. The inset shows the non-normalized data. The legend in the figure provides details for each data set.
Figure 11C:
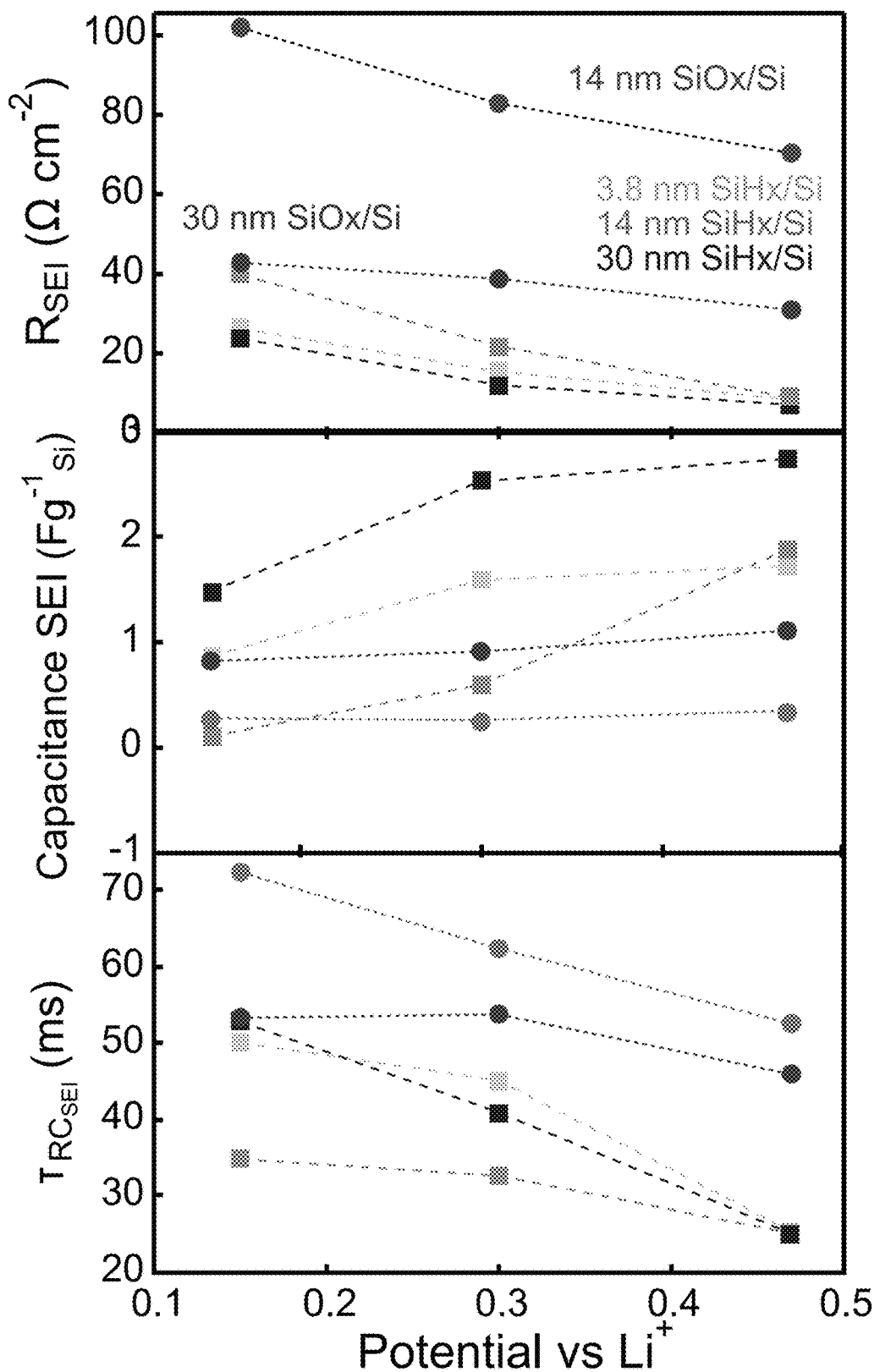
FIG. 11C illustrates (top) values of the resistance of the SEI layer extracted from fitting the impedance data; (middle) values of the capacitance of the SEI layer extracted from fitting the impedance data; and (bottom) RC time constants for impedance process associated with the SEI layer, according to some embodiments of the present disclosure.

The top panel of FIG. 11C displays plots $R_{SEI}$ after the first formation cycle. For all samples measured, $R_{SEI}$ decreased as the potential increased indicating that the electronic character of the SEI at these Si NPs varies with potential. The $SiO_x$-terminated Si NP anodes displayed increased $R_{SEI}$ compared to the $SiH_x$-terminated Si NPs, implying that $SiO_x$ contributes to the SEI and that it impedes $Li^+$ diffusion. The capacitance for this process is shown in the middle panel of FIG. 11C. Interestingly, the capacitance for the $SiH_x$-terminated Si NP anodes was higher than that of the corresponding oxidized $SiO_x$-terminated Si NP sample. This could mean that the SEI formed from $SiH_x$-terminated Si NP anodes accommodates more $Li^+$ or that the SEI is thicker. Finally, the RC time constants were plotted for all of the measured anodes. As shown in the bottom panel of FIG. 11C, the time constants were slower for the $SiO_x$— versus the $SiH_x$-terminated Si NPs electrodes. Taken together, all of these observations indicate that the electronic character of the SEI depends greatly on the inorganic surface of the Si NP. However, given that the capacity fade rate appears to be unaffected by the presence of $SiO_x$ and simply depends on the Si NP size, the differences in the SEI between $SiH_x$- and $SiO_x$-terminated silicon are unimportant with respect to the overall capacity fade mechanism.

Finally, to test whether the limited Li conduction (increased $R_{SEI}$ and decrease $C_{SEI}$) limits the rate capability of the electrode, a rate dependence experiment was performed in which the lithiation/delithiation rate capabilities were affected by the $SiO_2$ interface. The results are summarized in FIG. 11B. All of the samples measured showed a decrease in the delithiation capacity as the rate increased from C/20 to 10 C. However, the magnitude of scan rate dependence was strongly influenced by the Si NP size, where smaller diameter Si NPs retained more capacity with increasing scan rates compared to larger diameter Si NPs. Comparing the rate dependence for the samples of the same Si NP size, but with or without surface oxide layers, there appears to be no difference between the capacity drop between $SiH_x$- and $SiO_x$-terminated Si NP electrodes. This surprising finding suggests that the measured SEI character is not limiting the uptake of $Li^+$ during lithiation/delithiation. Rather, the limiting factor is related to Si NP size, indicating the $Li^+$-diffusion in silicon determines the rate dependence.

Non-Aromatic Surface Functionalized Si Nanoparticles.

FIGS. 12A and 12B illustrate how some types of non-aromatic reactants attach to the surface of starting plasma grown silicon nanoparticles to create functionalized Si NP. The reactants became covalently attached to the Si NP surface (Si*) by reacting with a surface silicon radical (*Si.). The surface *Si. can react with protic functional groups such as alcohols, thiols, amines, and carboxylic acids (to form Si*—O, Si*—S, Si*—N, and Si*—O bonds, respectively). Additionally, *Si. can react with the unsaturated functional groups of reactants such as alkenyl or carbonyl functional groups. Reactions with alkenyl groups result in the Si*—C bond forming at either the alpha (terminal) or beta (internal) carbon of the unsaturated group. Based on FTIR data it appears that carbonyl groups appear to form Si*—O bonds. Depending on the radical reaction step (propagation or termination), the other end of the unsaturated bond can be functionalized with a hydrogen (H) or silyl ($SiH_3$) group. These groups also can be other species depending on the chemistry of the radical termination step.

FIG. 12A illustrates diffuse reflectance infrared Fourier transform spectra (DRIFTS) of Si NPs functionalized using non-aromatic reactants, according to some embodiments of the present disclosure. This characterization demonstrates that covalent attachments between the Si NP surface and the reactants have been formed. The large peak ~2100 cm$^{-1}$ that is present in each spectrum is due to the stretching vibration of the Si—H bonds on the Si NP surface. The smaller adjacent peak ~2250 cm$^{-1}$ is due to the presence of oxygen back-bonded Si(O)—H bonds, indicative of the formation of a *Si—O bond on the same *Si atom as the *Si—H in the case of the Si@NMP and Si@OC$_{12}$ samples. The presence of similar characteristic back-bonded *Si(O)—H stretching frequencies in the Si@PEO$_2$ and Si@C6 indicates that the reaction with these liquid molecular reagents results in some degree of oxygen-containing impurities (e.g., *Si—OH). Finally, the cluster of peaks between ~2700-3000 cm$^{-1}$ is due to stretching vibrations from C—H bonds present in each of the molecules bonded to the *Si surface.

FIG. 12B illustrates the cycle lifetimes of Si NPs functionalized with non-aromatic reactants, once they were formulated into an electrode slurry, cast into a thin film electrode, and sections of the electrode were punched out, assembled into Li-ion half-cell batteries, and cycled to test the ability of the Si NPs functionalized with non-aromatic reactants to reversibly store Li-ions. The electrode slurry comprised 40 wt % of the functionalized Si NPs as the primary Li-ion storing active material, with 40 wt % conductive carbon (Timcal C65) and 20 wt % binder (poly-acrylic acid, PAA). The cycle lifetime plot records the amounts of Li-ions that the electrode can reversibly store on every cycle as a capacity normalized to the mass of the functionalized Si NPs (mAh/g Si@R). FIG. 12B illustrates that the type of Si NP functionalization, as a result of the type of reactant chosen, can affect the observed capacities exhibited by the Li-ion half-cell batteries. The different capacity retention from different surface functionalizations could in part be influenced by the processing characteristics of the electrode slurry and film casting process, since different surface chemistries also affect the slurry rheology and, ultimately, film morphology.

FIG. 12C illustrates a cycle lifetime plot that normalizes the capacity of each half-cell to that of the 4$^{th}$ cycle because the first three cycles are specially controlled as the "forming cycles". During the forming cycles, the battery was charged and discharged extra slowly to allow an SEI layer to form and/or an existing SEI layer to change between the electrolyte and the electrode. The formation of the SEI layer is largely responsible for the subsequent performance of the battery and determines its capacity retention along with many other performance characteristics. FIG. 12C demonstrates that by functionalizing the surface of the Si NPs before processing them into battery electrodes, the capacity retention characteristics of an electrode may be affected by changing the characteristics of the SEI layer that is produced during the forming cycles. As an example, the electrode containing Si@PEO$_2$ demonstrated superior capacity retention compared to the other electrodes containing Si NPs functionalized using other non-aromatic reactants.

FIG. 12D illustrates the coulombic efficiency of the batteries made using the Si NPs functionalized using non-aromatic reactants, for each cycle. The coulombic efficiency is the fraction of the delivered charge that is received back from the battery on any given charge-discharge cycle. A battery with a coulombic efficiency less than unity indicates that some of the charge is being irreversibly consumed by side reactions, such as additional SEI layer formation, which results in degradation of the performance of the battery including a shortening of its cycle lifetime. In FIG. 12D the coulombic efficiencies of the electrodes over their cycle lifetimes depended on the type of chemical functionality on the Si NP surface, which has a long-lasting impact on the stability of the SEI layer.

Aromatic Surface Functionalized Si Nanoparticles.

FIGS. 13A and 13B illustrate how some types of aromatic reactants attach to the surface of the plasma grown Si nanoparticles (Si NPs). The reactants became covalently attached to the Si NP surface (Si*) by reacting with a surface silicon radical (*Si.). The surface *Si. can react with protic functional groups such as alcohols, thiols, amines, and carboxylic acids (to form Si*—O, Si*—S, Si*—N, and Si*—O bonds, respectively). Additionally, *Si. can react with the unsaturated functional groups of reactants such as alkenyl or carbonyl functional groups. Reactions with alkenyl groups result in the Si*—C bond forming at either the alpha (terminal) or beta (internal) carbon of the unsaturated group. Based on FTIR data it appears that carbonyl groups appear to form Si*—O bonds. Depending on the radical reaction step (propagation or termination), the other end of the unsaturated bond can be functionalized with a hydrogen (H) or silyl (SiH$_3$) group. These groups also can be other species depending on the chemistry of the radical termination step.

FIG. 13A illustrates diffuse reflectance infrared Fourier transform spectra (DRIFTS) of the Si NPs functionalized using aromatic reactants, according to some embodiments of the present disclosure. Note the additional cluster of peaks ~3000-3100 cm$^1$ that are due to higher energy sp$^2$-hybridized C—H bonds on aromatic functionalities, demonstrating attachment of the aromatic type molecules to the Si nanoparticle surface. Lower intensity back-bonded *Si(O)—H and *Si—O (~1100 cm$^{-1}$) stretching frequencies relative to the non-aromatic surface groups indicates that the reaction with these aromatic molecular reagents resulted in a lesser degree of oxygen-containing impurities (e.g., *Si—OH) on the functionalized Si NP surface.

FIG. 13B illustrates the cycle lifetimes of the Si NPs functionalized using aromatic reactants, once they were formulated into an electrode slurry, cast into a thin film electrode, and sections of the electrode were punched out, assembled into Li-ion half-cell batteries, and cycled to test the ability of the functionalized Si NPs to reversibly store Li-ions. The electrode slurry comprised 40 wt % of the functionalized Si NPs as the primary Li-ion storing active material, with 40 wt % conductive carbon (C65) and 20 wt % binder (poly-acrylic acid, PAA) being other common components necessary for proper function of Li-ion battery electrodes. Note the change in the scaling of the x-axis and that the capacity retention behavior for these aromatic functionalized Si nanoparticles battery electrodes was generally more stable (longer cycle lifetimes) than those with non-aromatic type functionality.

FIG. 13C illustrates a cycle lifetime plot that normalizes the capacity to that of the 4$^{th}$ cycle because the first three cycles are specially controlled as the "forming cycles", as described above for the embodiments utilizing non-aromatic reactants. Note the change in the scaling of the x-axis and that the capacity retention behavior for these aromatic functionalized Si nanoparticles battery electrodes was generally more stable (longer cycle lifetimes) than those with non-aromatic type functionality.

FIG. 13D illustrates the coulombic efficiency of the batteries made using the functionalized Si NPs for each cycle. Note that the coulombic efficiencies (CEs) of the aromatic functionalized Si nanoparticle battery electrodes were generally higher and exhibited a rising trend when compared to the CEs of the non-aromatic functionalized Si nanoparticle battery electrodes (see FIG. 12D). This suggests that the π-conjugation in the aromatic type functionalization on the Si nanoparticles is beneficial for the stable and reversible cycling of the Si nanoparticles. When comparing the traces for the Si@PP and Si@ON NP-based electrodes, the coulombic efficiencies (CEs) were nearly identical for the first ~70 cycles, when the Si@ON electrode's CE precipitously drops. This drop off around cycle ~70 coincided with the beginning of the electrode's steady decline of capacity (see FIGS. 13B and 13C). The correlation between these two events suggests that this decline in CE and capacity is related to the degradation of the counter electrode in the Li-ion half-cell where the Li-metal foil has developed a high surface area during cycling that results in excessive SEI layer formation on the Li-metal and consumption of electrolyte components that are critical for the operation of the Si NP-containing electrode. This observation suggests that the electrodes containing some of the functionalized Si NPs are limited by the Li-metal counter electrode in the Li-ion half-cells and could exhibit improved capacity retention in a full-cell battery configuration. Testing of full cells along these lines could validate this hypothesis and demonstrate even great enhancements in CE and capacity retention from the Si NP-based anode.

Methods Example Set #1

Example 1

A method comprising: reacting, in a mixture, a silicon nanoparticle (Si NP) with a reactant, wherein: the Si NP has a silicon core, the silicon core has an outer surface comprising a silicon-hydrogen group (*SiH$_x$) where 1≤x≤3, *Si is a silicon atom on the outer surface of the Si NP, the reacting results in the converting of a portion of the *SiH$_x$ to produce a functionalized silicon nanoparticle comprising *SiH$_{3-x}$R$_x$, R is a ligand comprising at least one of —O—R', —C—R', —N—R', —Si—R', or —S—R', R' is a functional group derived from the reactant, and the reactant comprises at least one of a carbonaceous compound, an organic compound, or an inorganic compound.

Example 2

The method of Example 1, wherein the core has an average particle size between 1 nm and 500 nm.

Example 3

The method of Example 2, wherein the average particle size is between 3 nm and 75 nm.

Example 4

The method of Example 1, wherein the reactant comprises at least one of an alkenyl group, an alkynyl group, a carbonyl group, an aromatic, a halo group, an ester, an ether, an epoxide, a carboxylic acid, a carboxylate, an aldehyde, an alcohol, an alkoxide, a peroxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a thiol carbonyl, or a phosphonate.

Example 5

The method of Example 1, wherein R' comprises at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, or a thiol carbonyl.

Example 6

The method of Example 1, wherein the reactant comprises at least one of N-methyl-2-pyrrolidone (NMP), 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, 4-biphenyl carboxaldehyde, 4-terphenylol, 4-terphenyl thiol, 4-phenylazophenol, polyacrylic acid (PAA), polyacrylonitirile, polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, or 2,5-dimethoxybenzene-1,4-dicarboxaldehyde.

Methods Example Set #2: Reactions Occurring Before Incorporating the Functionalized Particles into an Anodic Mixture and/or Anode Example 7

The method of Example 1, wherein the reacting is performed in a vessel.

Example 8

The method of Example 1, wherein the mixture further comprises at least one of an initiator or a catalyst.

Example 9

The method of Example 8, wherein the initiator is a radical initiator.

Example 10

The method of Example 9, wherein the radical initiator comprises at least one of an azo functional group (R—N=N—R'), a peroxide functional group (R—O—O—R'), a dihalogen (Cl$_2$, Br$_2$, I$_2$), a carbon-halide functional group (R—C—X, X=F, Cl, Br, I), or nitrosyl group (R—N—O—H).

Example 11

The method of Example 10, wherein the radical initiator comprises at least one of 1,1'-azobis(cyclohexanecarbonitrile) (ABCN), AIBN, or TEMPO.

Example 12

The method of Example 1, wherein the reacting is initiated by a site located on the surface of the core.

Example 13

The method of Example 12, wherein the site is a silicon radical.

Example 14

The method of Example 1, wherein the mixture consists essentially of the Si NP and the reactant.

Example 15

The method of Example 7, wherein the reacting is performed at a temperature between −80° C. and 300° C.

Example 16

The method of Example 7, wherein the mixture further comprises a first solvent.

Example 17

The method of Example 16, wherein the reacting is performed at a temperature that is equal to or less than the boiling point of the mixture.

Example 18

The method of Example 16, wherein the first solvent comprises at least one of toluene or heptadecane.

Example 19

The method of Example 1, further comprising, after the reacting, a thermal treating of the functionalized silicon nanoparticle, wherein the thermal treating removes any remaining $SiH_x$ from the outer surface of the core.

Example 20

The method of Example 1, further comprising, after the reacting, a thermal treating of the functionalized silicon nanoparticle, wherein the thermal treating removes results in a compositional change to the ligand R.

Methods Example Set #3: Reactions Occurring in an Anodic Mixture

Example 21

The method of Example 1, further comprising after the reacting, applying the mixture to an electrically conductive material.

Example 22

The method of Example 21, wherein the mixture consists essentially of the functionalized silicon nanoparticle.

Example 23

The method of Example 21, wherein the electrically conductive material comprises at least one of copper, steel, or carbon.

Example 24

The method of Example 21, wherein the method further comprises, prior to the applying, adding to the mixture at least one of a conductive material or a binder.

Example 25

The method of Example 24, wherein at least at least a first portion of the reacting occurs during at least one of the adding or the applying.

Example 26

The method of Example 24, wherein the binder comprises at least one of polyethylene oxide (PEO), polyvinylidene fluoride, styrene butadiene rubber, polyacrylonitrile, carboxymethyl cellulose, polyacrylic acid (PAA), lithium polyacrylate, Nafion, polyacetylene, polyphenylene acetylene, or polyphenylene imide.

Example 27

The method of Example 24, wherein the conductive material comprises at least one of carbon black, an amorphous carbon, a glassy carbon, a single walled carbon nanotube, a multiwalled carbon nanotube, a functionalized carbon nanotube, graphene, graphene oxide, a functionalized graphene oxide, or a carbon fiber.

Example 28

The method of Example 21, wherein the mixture further comprises a second solvent.

Example 29

The method of Example 28, wherein the second solvent is aprotic.

Example 30

The method of Example 29, wherein the second solvent comprises at least one of NMP, water, toluene, dihydrolevoglucosenone, tetrahydrofuran, diethyl ether, dimethyl ether, diphenylether, ditert-butyl ether, dioctyl ether, dimethoxy ethane, or a glyme.

Example 31

The method of Example 21, wherein the applying is performed by at least one of blade coating, slot-die coating, spray coating, inkjet printing, or screen printing.

Example 32

The method of Example 21, further comprising, after the applying, a thermal annealing of the mixture, resulting in the transforming of the mixture to a solid and the forming of an anode comprising the solid and the electrically conductive material.

Example 33

The method of Example 32, wherein at least a second portion of the reacting occurs during the thermal annealing.

Methods Example Set #4: Reaction Occurring Due to Cycling of the Battery

Example 34

The method of Example 32, further comprising: fabricating a battery, wherein the fabricating comprises: positioning a cathode and the anode in an electrolyte, wherein; the cathode and the anode are ionically and electrically in contact.

Example 35

The method of Example 34, wherein the positioning causes at least a third portion of the reacting to occur.

Example 36

The method of Example 34, wherein the electrolyte comprises a third solvent.

Example 37

The method of Example 36, wherein the third solvent comprises at least one of diethyl carbonate, ethylene carbonate, dimethyl carbonate, ethyl methyl carbonate, propylene carbonate, glyme, diglyme, tetraglyme, or a polymer.

Example 38

The method of Example 37, wherein the polymer comprises at least one of polyethylene oxide or polyacrylonitrile.

Example 39

The method of Example 34, wherein the electrolyte is substantially a solid.

Example 40

The method of Example 39, wherein the electrolyte comprises at least one of lithium phosphate oxynitride, lithium hexfluorophosphate, lithium fluorosulfonimide, or lithium trifluoromethylsulfonimide.

Example 41

The method of Example 35, further comprising: cycling the battery between a charged state and a discharged state, wherein: at least a fourth portion of the reacting occurs as a result of the cycling.

Example 42

The method of Example 41, wherein the charged state is achieved at a first potential between 0 mV and 300 mV vs. Li/Li$^+$.

Example 43

The method of Example 41, wherein the discharged state is achieved at a second potential between 1000 mV and 3000 mV vs. Li/Li$^+$.

Example 44

The method of Example 41, wherein the cycling is achieved by applying a constant reducing or oxidizing electrical current.

Example 45

The method of Example 41, wherein: at least one of the applying, the adding, or the cycling results in a second reacting, and the second reacting corresponds to a reaction of at least one of the *SiH$_x$, a portion of the *SiH$_{3-x}$R$_x$, a portion of the electrolyte, a portion of the binder, or a portion of the conductive material reacting with at least one of the *SiH$_x$, the *SiH$_{3-x}$R$_x$, the electrolyte, the binder, or the conductive material to form a layer on the functionalized silicon nanoparticle.

Compositions Example Set #5

Example 1

A silicon nanoparticle comprising: a core of silicon having an outer surface comprising *SiH$_{3-x}$R$_x$, wherein: *Si is a silicon atom on the outer surface, the first layer covers at least a portion of the outer surface, R is a ligand comprising at least one of —O—R', —C—R', —N—R', —Si—R', or —S—R', and R' is a functional group comprising at least one of carbon, oxygen, nitrogen, hydrogen, sulfur, or phosphorus.

Example 2

The composition of Example 1, wherein the core has an average particle size between 1 nm and 500 nm.

Example 3

The composition of Example 2, wherein the average particle size is between 3 nm and 75 nm.

Example 4

The composition of Example 1, wherein R' is derived from a reactant.

Example 5

The composition of Example 4, wherein the reactant comprises at least one of N-methyl-2-pyrrolidone (NMP), 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, 4-biphenyl carboxaldehyde, 4-terphenylol, 4-terphenyl thiol, 4-phenylazophenol, polyacrylic acid (PAA), polyacrylonitirile, polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, or 2,5-dimethoxybenzene-1,4-dicarboxaldehyde.

Example 6

The composition of Example 1, wherein R' comprises at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, or a thiol carbonyl.

Example 7

The composition of Example 1, further comprising: a second layer comprising at least one of a binder, a conductive material, or an electrolyte, wherein: the second layer comprises an inner surface, and the first layer is positioned between the core and the second layer.

Example 8

The composition of Example 7, wherein the binder comprises at least one of polyethylene oxide (PEO), polyvinylidene fluoride, styrene butadiene rubber, polyacrylonitrile, carboxymethyl cellulose, polyacrylic acid (PAA), lithium polyacrylate, Nafion, polyacetylene, polyphenylene acetylene, or polyphenylene imide.

Example 9

The composition of Example 7, wherein the conductive material comprises at least one of carbon black, an amorphous carbon, a glassy carbon, a single walled carbon nanotube, a multiwalled carbon nanotube, a functionalized carbon nanotube, graphene, graphene oxide, a functionalized graphene oxide, or a carbon fibers.

Example 10

The composition of Example 7, wherein the electrolyte comprises at least one of diethyl carbonate, ethylene carbonate, dimethyl carbonate, ethyl methyl carbonate, propylene carbonate, glyme, diglyme, tetraglyme, or a polymer.

Example 11

The composition of Example 10, wherein the polymer comprises at least one of polyethylene oxide or polyacrylonitrile.

Example 12

The composition of Example 7, wherein the electrolyte comprises at least one of lithium phosphate oxynitride, lithium hexfluorophosphate, lithium fluorosulfonimide, or lithium trifluoromethylsulfonimide.

Example 13

The composition of Example 7, wherein: the first layer and the second layer form an interface at the outer surface of the first layer and the inner surface of the second layer, and a portion of at least one of the binder, the conductive material, or the electrolyte has reacted with a portion of the first layer, resulting in a modified first layer.

Example 14

The composition of Example 13, wherein the modified layer includes the removal of a portion of the ligand.

Example 15

The composition of Example 13, wherein the modified layer includes the transfer of a portion of at least one of the binder, the conductive material, or the electrolyte into the outer surface of the first layer.

Example 16

The composition of Example 7, further comprising a gap positioned between the first layer and the second layer.

Example 17

The composition of Example 7, further comprising a third layer positioned between the first layer and the second layer.

Example 18

The composition of Example 1, wherein the first layer is capable of volume expansion and contraction as a result of mass transfer of an ion into and out of the core.

Example 19

The composition of Example 18, wherein the ion is at least one of a lithium ion or a magnesium ion.

Example 20

The composition of Example 7, wherein at least one of the first layer or the second layer is capable of volume expansion and contraction as a result of mass transfer of an ion into and out of the core.

Example 21

The composition of Example 20, wherein the ion is at least one of a lithium ion or a magnesium ion.

Example 22

The composition of Example 17, wherein at least one of the first layer, the second layer, or the third layer is capable of volume expansion and contraction as a result of mass transfer of an ion into and out of the core.

Example 23

The composition of Example 22, wherein the ion is at least one of a lithium ion or a magnesium ion.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A silicon nanoparticle (Si NP) comprising:
   a core of silicon having an outer surface comprising *SiH$_{3-x}$R$_x$ where 1≤x≤3;
   a first layer that covers at least a portion of the outer surface; and
   a second layer comprising at least one of a binder, a conductive material, or an electrolyte, wherein:
   *Si is a silicon atom on the outer surface of the Si NP,
   the first layer is positioned between the core and the second layer,
   R is a ligand comprising at least one of —O—R', —C—R', —N—R', —Si—R', or —S—R', and
   R' is a functional group comprising at least one of boron, carbon, oxygen, nitrogen, hydrogen, sulfur, or phosphorus.

2. The silicon nanoparticle of claim 1, wherein the core has an average particle size between 1 nm and 500 nm.

3. The silicon nanoparticle of claim 2, wherein the average particle size is between 3 nm and 75 nm.

4. The silicon nanoparticle of claim 1, wherein R' is derived from a reactant.

5. The silicon nanoparticle of claim 4, wherein the reactant comprises at least one of N-methyl-2-pyrrolidone, 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, 4-biphenyl carboxaldehyde, 4-terphenylol, 4-terphenyl thiol, 4-phenylazophenol, polyacrylic acid, polyacrylonitirile, polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, or 2,5-dimethoxybenzene-1,4-dicarboxaldehyde.

6. The silicon nanoparticle of claim 1, wherein R' comprises at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, or a thiol carbonyl.

7. The silicon nanoparticle of claim 1, wherein the binder comprises at least one of polyethylene oxide (PEO), polyvinylidene fluoride, styrene butadiene rubber, polyacrylonitrile, carboxymethyl cellulose, polyacrylic acid, lithium polyacrylate, Nafion, polyacetylene, polyphenylene acetylene, or polyphenylene imide.

8. The silicon nanoparticle of claim 1, wherein the conductive material comprises at least one of carbon black, an amorphous carbon, a glassy carbon, a single walled carbon nanotube, a multiwalled carbon nanotube, a functionalized carbon nanotube, graphene, graphene oxide, a functionalized graphene oxide, or a carbon fiber.

9. The silicon nanoparticle of claim 1, wherein the electrolyte comprises at least one of diethyl carbonate, ethylene carbonate, dimethyl carbonate, ethyl methyl carbonate, propylene carbonate, glyme, diglyme, tetraglyme, or a polymer.

10. The silicon nanoparticle of claim 9, wherein the polymer comprises at least one of polyethylene oxide or polyacrylonitrile.

11. The silicon nanoparticle of claim 1, wherein the electrolyte comprises at least one of lithium phosphate oxynitride, lithium hexfluorophosphate, lithium fluorosulfonimide, or lithium trifluoromethylsulfonimide.

12. The silicon nanoparticle of claim 1, further comprising a gap positioned between the first layer and the second layer.

13. The silicon nanoparticle of claim 1, wherein at least one of the first layer or the second layer is capable of volume expansion and contraction as a result of mass transfer of an ion into and out of the core.

14. The silicon nanoparticle of claim 13, wherein the ion is at least one of a lithium ion or a magnesium ion.

15. A method comprising:
    reacting, in a mixture, a silicon nanoparticle (Si NP) with a reactant, wherein:
    the Si NP has a silicon core
    having an outer surface comprising a silicon-hydrogen group (*SiH$_x$) where 1≤x≤3,
    *Si is a silicon atom on the outer surface of the Si NP, and
    the reacting results in the forming of a functionalized Si NP comprising:
    a silicon core with the outer surface comprising *SiH$_{3-x}$R$_x$ where 1≤x≤3;
    a first layer that covers at least a portion of the outer surface; and
    a second layer comprising at least one of a binder, a conductive material, or an electrolyte, wherein:
    the first layer is positioned between the core and the second layer,
    R is a ligand comprising at least one of —O—R', —C—R', —N—R', —Si—R', or —S—R', and
    R' is a functional group comprising at least one of boron, carbon, oxygen, nitrogen, hydrogen, sulfur, or phosphorus.

16. The method of claim 15, wherein the reactant comprises at least one of an alkenyl group, an alkynyl group, a carbonyl group, an aromatic, a halo group, an ester, an ether, an epoxide, a carboxylic acid, a carboxylate, an aldehyde, an alcohol, an alkoxide, a peroxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a thiol carbonyl, or a phosphonate.

17. The method of claim 15, wherein R' comprises at least one of an alkyl group, an alkenyl group, an alkynyl group, a carbonyl group, an aromatic, a halo group, an ester, an ether, a carboxylic acid, a carboxylate, an aldehyde, an alcohol, an alkoxide, an amine, an amide, an imine, an imide, a diimide (azo group), a nitrile, a cyanate, a nitroso, an oxime, a nitro, a thiol, a thiolate, a sulfonyl, a sulfonic acid, a sulfonate, a sulfonamide, a phosphonic acid, a phosphonate, or a thiol carbonyl.

18. The method of claim 15, wherein the reactant comprises at least one of N-methyl-2-pyrrolidone, 1-hexene, 1-hexanol, 1-hexanethiol, 1-dodecene, 1-dodecanol, 1-dodecanethiol, 1-octadecene, 1-octadecanol, 1-octadecanethiol, polyethylene glycol methyl ether, polyethylene oxide vinyl ether, phenol, aniline, benzoic acid, benzaldehyde, styrene, 2-naphthol, 2-vinylnaphthalene, 2-naphthalenemethanol, 4-vinyl biphenyl, 4-phenyl phenol, 4-biphenyl methanol, 4-biphenyl carboxaldehyde, 4-terphenylol, 4-terphenyl thiol, 4-phenylazophenol, polyacrylic acid, polyacrylonitirile, polyethylene oxide, acrylic acid, lithium acrylate, benzene-1,4-dicarboxaldehyde, benzene-1,3-dicarboxaldehyde, benzene-1,3,5-tricarboxaldehyde, 4-formylbenzoic acid, 4-(4-formylphenoxy)benzaldehyde, tris(4-formylphenyl)amine, 2,5-thiophenedicarboxaldehyde, 2,6-pyridinedicarboxaldehyde, thieno[3,2-b]thiophene-2,5-dicarboxaldehyde, or 2,5-dimethoxybenzene-1,4-dicarboxaldehyde.

* * * * *